(12) United States Patent
Huang et al.

(10) Patent No.: US 12,451,126 B2
(45) Date of Patent: *Oct. 21, 2025

(54) DETECTION OF POTENTIAL EXFILTRATION OF AUDIO DATA FROM DIGITAL ASSISTANT APPLICATIONS

(71) Applicant: GOOGLE LLC, Mountain View, CA (US)

(72) Inventors: Yan Huang, Mountain View, CA (US); Nikhil Rao, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,034

(22) Filed: Feb. 13, 2024

(65) Prior Publication Data

US 2024/0185843 A1 Jun. 6, 2024

Related U.S. Application Data

(63) Continuation of application No. 17/321,038, filed on May 14, 2021, now Pat. No. 11,908,459, which is a
(Continued)

(51) Int. Cl.
*G10L 15/00* (2013.01)
*G06F 21/60* (2013.01)
(Continued)

(52) U.S. Cl.
CPC ............. *G10L 15/18* (2013.01); *G06F 21/60* (2013.01); *G10L 15/22* (2013.01); *G10L 25/54* (2013.01);
(Continued)

(58) Field of Classification Search
CPC .......... G06F 3/016; G06F 21/55; G06F 21/60; G06F 21/70; G10L 15/02; G10L 15/07;
(Continued)

(56) References Cited

U.S. PATENT DOCUMENTS 6,173,169 B1 * 1/2001 Oh ................ H04M 1/724
379/51
6,600,406 B1 * 7/2003 Ha .................. G07C 9/00182
340/5.23
(Continued)

*Primary Examiner* — Vu B Hang
(74) *Attorney, Agent, or Firm* — Gray Ice Higdon

(57) ABSTRACT

The present disclosure is generally related to a data processing system to detect potential exfiltration of audio data by agent applications can include a data processing system. The data processing system can identify, from an I/O record, an input received from the digital assistant application via a microphone of a client device, an output received from the agent application after the input, and a microphone status for the microphone. The data processing system can determine that the output is terminal based on the input and the output. The data processing system can identify the microphone status as in the enabled state subsequent to the input. The data processing system can determine that the agent application is unauthorized to access audio data acquired via the microphone of the client device based on determining that the output is terminal and identifying the microphone status as enabled.

20 Claims, 6 Drawing Sheets

Related U.S. Application Data continuation of application No. 16/780,299, filed on Feb. 3, 2020, now Pat. No. 11,011,159, which is a continuation of application No. 16/131,439, filed on Sep. 14, 2018, now Pat. No. 10,565,985.

(51) Int. Cl.
| | | |
|---|---|---|
| *G10L 15/18* | (2013.01) | |
| *G10L 15/22* | (2006.01) | |
| *G10L 25/54* | (2013.01) | |
| *G10L 25/78* | (2013.01) | |
| *G06F 21/55* | (2013.01) | |

(52) U.S. Cl.
CPC ............ *G10L 25/78* (2013.01); *G06F 21/554* (2013.01); *G06F 21/556* (2013.01); *G10L 2015/223* (2013.01)

(58) Field of Classification Search
CPC ....... G10L 15/22; G10L 15/30; G10L 15/265; G10L 15/1822; G10L 15/183; G10L 25/78; G10L 25/87; G10L 19/005; G10L 19/00; G10L 15/16; G10L 25/27; G10L 25/30; G10L 15/20

See application file for complete search history.

(56) References Cited

U.S. PATENT DOCUMENTS

| | | |
|---|---|---|
| 7,953,219 B2 | 5/2011 | Freedman et al. |
| 9,349,015 B1 | 5/2016 | Archer et al. |
| 10,565,985 B1 | 2/2020 | Huang et al. |
| 10,909,971 B2 | 2/2021 | Huang et al. |
| 11,011,159 B2 * | 5/2021 | Huang .................... G06F 3/167 |
| 2013/0097660 A1 | 4/2013 | Das et al. |
| 2013/0324099 A1 | 12/2013 | Dgani et al. |
| 2018/0150129 A1 | 5/2018 | Thomas |
| 2019/0050443 A1 | 2/2019 | Rosu |
| 2020/0097812 A1 | 3/2020 | Csar |
| 2020/0175967 A1 | 6/2020 | Huang et al. |

* cited by examiner

DETECTION OF POTENTIAL EXFILTRATION OF AUDIO DATA FROM DIGITAL ASSISTANT APPLICATIONS

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response when the responding computing device is at or above its processing capacity, which may result in inefficient bandwidth utilization. A portion of the excessive network transmissions can include transmissions for requests that are not valid requests.

SUMMARY

According to an aspect of the disclosure, a system to detect potential exfiltration of audio data by agent applications that interface with digital assistant applications can include a data processing system. The data processing system can have an exchange logger component, a sequence analyzer component, a microphone use detector component, an extrusion detector component, and an agent manager component. The exchange logger component can access a log database that maintains an input/output (I/O) record between an agent application that executes on a client device and a digital assistant application that executes on the client device. The exchange logger component can identify, from the I/O record of the log database, an input received from the digital assistant application via a microphone of the client device, an output received from the agent application that interfaces with the digital assistant application subsequent to the input, and a microphone status that indicates one of an enabled state and a disabled state of the microphone subsequent to the input. The sequence analyzer component can determine that the output is terminal to the input based on a first set of strings included in the input and a second set of strings included in the output. The microphone use detector component can identify the microphone status of the microphone as in the enabled state subsequent to the input. The extrusion detector component an determine that the agent application is unauthorized to access audio data acquired via the microphone of the client device based on the determination that the output is terminal to the input and the identification of the microphone status as in the enabled state. The agent manager component can perform an action on at least one of the agent application and the digital assistant application, responsive to the determination that the agent application is unauthorized to access the audio data acquired via the microphone.

According to an aspect of the disclosure, a method detecting exfiltration of audio data by agent applications that interface with digital assistant applications can include accessing a log database that maintains an input/output (I/O) record between an agent application that executes on a client device and a digital assistant application that executes on the client device. The method can include identifying, from the I/O record of the log database, an input received from the digital assistant application via a microphone of the client device, an output received from the agent application that interfaces with the digital assistant application subsequent to the input, and a microphone status that indicates one of an enabled state and a disabled state of the microphone subsequent to the input. The method can include determining that the output is terminal to the input based on a first set of strings included in the input and a second set of strings included in the output. The method can include identifying the microphone status of the microphone as in the enabled state subsequent to the input. The method can include determining that the agent application is unauthorized to access audio data acquired via the microphone of the client device based on determining that the output is terminal to the input and identifying of the microphone status as in the enabled state. The method can include performing an action on at least one of the agent application and the digital assistant application, responsive to determining that the agent application is unauthorized to access the audio data acquired via the microphone.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
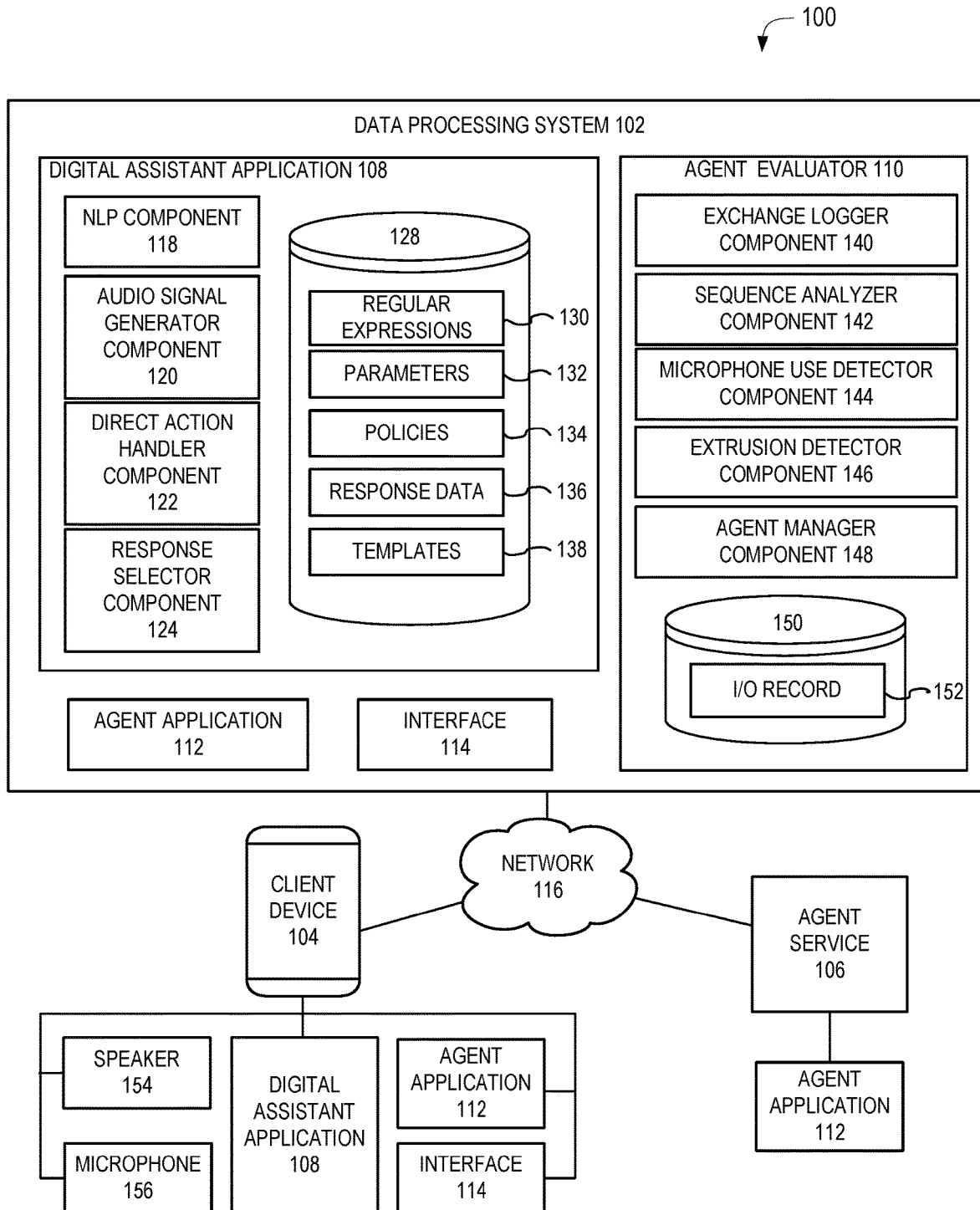
FIG. 1 illustrates a block diagram of an example system to detect potential exfiltration of audio data by agent applications that interface with digital assistant applications, in accordance with an example of the present disclosure.

Following below are more detailed descriptions of various concepts related to and implementations of, methods, apparatuses, and systems to detect potential exfiltration of audio data by agent applications that interface with digital assistant applications. The various concepts introduced above and discussed in greater detail below may be implemented in any of numerous ways.

A digital assistant application can interface with agent applications by invoking functions in accordance with application programming interface protocols. Upon receipt of an input audio signal via a microphone on a client device, the digital assistant application can parse the input audio signal to identify words from the input audio signal. The digital assistant application can determine that the words refer to a function of a particular agent application administered by an agent service. With the determination, the digital assistant application can invoke the function of the agent application referred to in the input audio signal. In addition, the digital assistant application can permit the agent application to access audio data acquired via the microphone. Using the functions of the agent application, the capabilities of the digital assistant application can be augmented.

By allowing agent applications access to the audio data acquired via the microphone, the agent application can continue carrying out the functions referenced in the words parsed from subsequent input audio signals. This can lead to the further augmentation of the capabilities of the digital assistant application. Permitting unrestricted, continuous access to the audio data, however, can open up the digital assistant application to potential security vulnerabilities, such as data exfiltration and eavesdropping. In addition, this access can result in degradation of data privacy and information security, as persons approximate to the client device carry conversations not intended for the microphone are sent to the agent service for the agent application. The continuous accessing of the audio data acquired via by the microphone can occur as a result of unintentional or intentional configuration of the agent application. In either case, the digital assistant application can become vulnerable to security and privacy lapses. Such vulnerabilities can be exacerbated when the configuration of the agent application to continue to access the audio data acquired via the microphone is done by a malicious entity.

To address the potential security vulnerabilities stemming from the interfacing, the present systems and methods can determine when the continuous access of the audio data from the microphone is authorized or unauthorized. An agent evaluator running on a data processing system can analyze an input/output (I/O) record for the agent application interfacing with the digital assistant application across a multitude of client devices. The I/O record can include a series of inputs from the digital assistant application to the agent application and a series of outputs from the agent application the digital assistant application. Each input can correspond to a query parsed by the digital assistant application from the input audio signal acquired by the microphone. Each output can correspond to a response from the agent application. The strings in both the input and output can be a message in a natural language syntax forming a conversation between the end user and the agent application through the digital assistant application. The I/O record can also include a log of microphone statuses of the microphone of the client device indicating when the microphone status is enabled or disabled during the series of inputs and outputs.

The agent evaluator can inspect the I/O record to find behavior in the agent application indicative of unauthorized accessing of the audio data from the microphone. Using natural language processing techniques, the agent evaluator can determine whether an output message from the agent application is anticipatory or terminal to an input message from the digital assistant application. The output message can be determined as anticipatory, when the message is found to include certain keywords that correlate with an extension of a conversation. Examples of keywords correlating to anticipatory messages can include, "would you," "where," and "more," among others. The output message can be determined as terminal, when the message is found to include certain keywords that correlate with the end of a conversation. Examples of keywords correlating to the terminal messages can include "found," "done," and "results," among others.

When the output message is determined to anticipatory to the input message, the agent evaluator can determine that the agent application is authorized to access the audio data acquired from the microphone. With an anticipatory output message, the user of the digital assistant application can expect the conversation to continue in invoking the functions of the agent application. As such, the agent application can be permitted to continued access to the audio data. On the other hand, when the output message is determined to be terminal to the input message, the agent evaluator can identify the microphone status subsequent to the input message from the I/O record. If the microphone status is identified in the disabled state, the agent evaluator can determine that the agent application is not attempting to gain unauthorized access to the audio data. In contrast, if the microphone status is identified in the enabled state, the agent evaluator can determine that the agent application is attempting to gain unauthorized access to the audio data acquired from the microphone. With a terminal output message, the user of the digital assistant application may be no longer expecting the microphone to continue to pick up any sound emitted from the user or the surroundings. Because of this expectation, the agent application may not be allowed to access the audio data and the microphone status as enabled may represent an attempt at unauthorized access to the audio data.

With the determination that the agent application is unauthorized to access the audio data acquired from the microphone, the agent evaluator can perform any number of countermeasures. The agent evaluator can restrict the agent application from accessing the audio data acquired via the microphone. The agent evaluator can also cause the digital assistant application to present a prompt informing the user that the agent application is unauthorized to access the audio data. Additionally, the agent evaluator can notify a developer associated with the agent application that the agent application is attempting to gain unauthorized access to the audio data. Performing such countermeasures can reduce the security vulnerabilities of the digital assistant application in interfacing with the agent application, preventing data exfiltration and eavesdropping. In addition, these countermeasures can improve privacy and information security.

Referring to FIG. 1, depicted is an example system 100 to detect potential exfiltration of audio data by agent applications that interface with digital assistant applications. The system 100 can include at least one data processing system 102, one or more client devices 104, and one or more agent services 106. The one or more client devices 104 can be communicatively coupled to the one or more agent services 106, and vice-versa. The at least one data processing system 102, one or more client devices 104, and one or more agent services 106 can be communicatively coupled to one another via the network 116.

The data processing system 102 can include an instance of the digital assistant application 108. The digital assistant application 108 can include a natural language processor (NLP) component 118 to parse audio-based inputs. The digital assistant application 108 can include an audio signal generator component 120 to generate audio-based signals. The digital assistant application 108 can include a direct action handler 122. The digital assistant application 108 can include a response selector component 124 to select responses to audio-based input signals. The NLP component 118, the audio signal generator component 120, the data repository 128, the direction action handler 122, and the response selector component 124 separate from the digital assistant application 108. The data processing system 102 can include a data repository 128. The data repository 128 can store regular expressions 130, parameters 132, policies 134, response data 136, and templates 138. The data processing system 102 can also include an agent evaluator 110 and an instance of an agent application 112, among others. The agent evaluator 110 can include at least one exchange logger component 140, at least one sequence analyzer component 142, at least one microphone use detector component 144, at least one agent manager component 148, and at least one data repository 150. The data repository 150 can store and maintain an input/output (I/O) record 152 (sometimes referred herein as an I/O stream). The agent evaluator 110 can be a separate application from the digital assistant application 108. The agent evaluator 110 can be a part of the digital assistant application 108. The data processing system 102 can include an instance of one or more agent applications 112.

The functionalities of the data processing system 102, such as the digital assistant application 108, can be included or otherwise be accessible from the one or more client devices 104. The functionalities of the data processing system 102 may correspond to the functionalities or interface with the digital assistant application 108 executing on the client devices 104. The client devices 104 can each include and execute a separate instance of the one or more components of the digital assistant application 108. The client devices 104 can otherwise have access to the functionalities of the components of the digital assistant application 108 on a remote data processing system 102 via the network 116. For example, the client device 104 can include the functionalities of the NLP component 118 and access the remainder of the components of the digital assistant application 108 via the network 116 to the data processing system 102.

The client devices 104 can each include at least one logic device such as a computing device having a processor to communicate with each other with the data processing system 102 via the network 116. The client devices 104 can include an instance of any of the components described in relation to the data processing system 102. The client devices 104 can include an instance of the digital assistant application 108. The client devices 104 can include a desktop computer, laptop, tablet computer, personal digital assistant, smartphone, mobile device, portable computer, thin client computer, virtual server, speaker-based digital assistant, or other computing device.

The components of the system 100 can communicate over a network 116. The network 116 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 116 can include a wireless link, such as an infrared channel or satellite band. The topology of the network 116 may include a bus, star, or ring network topology. The network 116 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client device 104 can include, execute, interface, or otherwise communicate with one or more of at least one instance of the digital assistant application 108, at least one instance of the agent application 112, and at least one interface 114, among others. In addition, the client device 104 can include, interface, or otherwise communicate with at least one speaker 154 and at least one microphone 156. The client device 104 can include an audio driver to provide a software interface with the speaker 154 and the microphone 156. The audio driver can execute instructions provided by the data processing system 102 to control the speaker 154 to generate a corresponding acoustic wave or sound wave. The audio driver can execute an audio file or other instructions to convert an acoustic wave or sound wave acquired from the microphone 156 to generate audio data. For example, the audio driver can execute an analog-to-driver converter (ADC) to transform the acoustic wave or sound wave to the audio data.

The instance of the digital assistant application 108 on the client device 104 can include or be executed by one or more processors, logic array, or memory. The instance of the digital assistant application 108 on the client device 104 can detect a keyword and perform an action based on the keyword. The digital assistant application 108 on the client device 104 can be an instance of the digital assistant application 108 executed at the data processing system 102 or can perform any of the functions of the digital assistant application 108. The instance of the digital assistant application 108 on the client device 104 can filter out one or more terms or modify the terms prior to transmitting the terms as data to the data processing system 102 (e.g., the instance of the digital assistant application 108 on the data processing system 102) for further processing. The instance of the digital assistant application 108 on the client device 104 can convert the analog audio signals detected by the speaker 154 into a digital audio signal and transmit one or more data packets carrying the digital audio signal to the data processing system 102 via the network 116. The instance of the digital assistant application 108 on the client device 104 can transmit data packets carrying some or the entire input audio signal responsive to detecting an instruction to perform such transmission. The instruction can include, for example, a trigger keyword or other keyword or approval to transmit data packets comprising the input audio signal to the data processing system 102.

The instance of the digital assistant application 108 on the client device 104 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The instance of the digital assistant application 108 on the client device 104 can apply the bandpass filter prior to transmitting the input audio signal to the data processing system 102, thereby reducing network bandwidth utilization. However, based on the computing resources available to the client device 104 and the available network bandwidth, it may be more efficient to provide the input audio signal to the data processing system 102 to allow the data processing system 102 to perform the filtering. The instance of the digital assistant application 108 on the client device 104 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display.

The client device 104 can be associated with an end user that enters voice queries as audio input into the client device 104 (via the microphone 156 or speaker 154) and receives audio (or other) output from the data processing system 102 or agent services 106 to present, display, or render to the end user of the client device 104. The digital component can include a computer-generated voice that can be provided from the data processing system 102 or the agent service 106 to the client device 104. The client device 104 can render the computer-generated voice to the end user via the speaker 154. The computer-generated voice can include recordings from a real person or computer-generated language. The client device 104 can provide visual output via a display device communicatively coupled to the client device 104.

The client device 104 or the agent service 106 can include or execute an instance of the agent application 112. The client device 104 can include or execute an instance of the agent application 112. The agent application 112 can include one or more components with similar functionalities as the digital assistant application 108. Instances of the agent application 112 can be executed on the data processing system 102 and the agent service 106. The digital assistant application 108 can interface with the agent application 112, and vice-versa to carry out predefined functions. The agent application 112 can access resources on the agent service 106 in carrying out the function indicated in the input audio signal. The client device 104 can receive an input audio signal detected by a microphone 156 of the client device 104.

Based on parsing the input audio signal, the digital assistant application 108 can determine which agent application 112 to interface with in processing the input audio signal. The input audio signal can include, for example, a query, question, command, instructions, or other statement in a natural language. The input audio signal can include an identifier or name of a third-party (e.g., one of the providers for the agent applications 112 associated with the agent service 106) to which the question or request is directed. For example, the voice query can include the name of the subscription-based music service (e.g., one of the providers of the agent applications 112 associated with the agent service 106) in the input audio signal. The digital assistant application 108 can determine that the voice query includes the name of the music service and can identify the agent service 106 and the agent application 112 to interface with. For example, the input audio signal can include "Play my music playlist on XYZ Music Service." The music service can provide the audio files associated with the playlist to the client device 104 through the network 116 or to the agent service 106 or the data processing system 102. The agent service 106 or the data processing system 102 can provide the songs associated with the playlist to the client device 104 through the network 116. Upon receipt of the audio files, the agent application 112 or the digital assistant application 108 on the client device 104 can playback the audio file. The input audio signal can include one or more predefined keywords referencing a functionality of the third-party (e.g., "ride," "pay," and "airplane"). For example, the voice query of the input audio signal can include "Get me a ride." The digital assistant application 108 can determine that the voice query is referencing the functionality of a ridesharing service, and can forward the voice query to the agent service 106 handling the voice queries for the agent application 112. The functionalities of the agent application 112 with respect to the agent service 106 and the digital assistant application 108 will be detailed herein below.

The data processing system 102 and the agent service 106 each can include at least one server having at least one processor. For example, the data processing system 102 and the agent service 106 each can include a plurality of servers located in at least one data center or server farm. The data processing system 102 can determine from an audio input signal a request and a trigger keyword associated with the request. Based on the request and trigger keyword, the data processing system 102 can determine whether to forward the audio input signal to the agent service 106 or to process the audio input signal internally. Responsive to the determination that the audio input signal is to be processed internally, the data processing system 102 can generate or select response data. The response data can be audio-based or text-based. For example, the response data can include one or more audio files that, when rendered, provide an audio output or acoustic wave. The data within the response data can also be referred to as content items. The response data can include other content (e.g., text, video, or image content) in addition to audio content. Responsive to the determination that the audio input signal is to be forwarded, the data processing system 102 can send the audio input signal to the agent service 106. The agent service 106 can parse the audio input signal to identify a command to execute. The agent service 106 can carry out the command and return a result of the command to the data processing system 102 or the client device 104.

The data processing system 102 and the agent service 106 each can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous-one or more of the servers or machines can operate according to one or more type of operating system platform. The data processing system 102 and the agent service 106 each can include servers in a data center that are stored in one or more high-density rack systems, along with associated storage systems, located for example in an enterprise data center. In this way, the data processing system 102 or the agent service 106 with consolidated servers can improve system manageability, data security, the physical security of the system, and system performance by locating servers and high performance storage systems on localized high performance networks. Centralization of all or some of the data processing system 102 or agent service 106 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repositories 128 and 150 and with other computing devices. The agent service 106 can also include at least one processing unit, server, virtual server, circuit, engine, agent, appliance, or other logic device such as programmable logic arrays configured to communicate with a data repository and with other computing devices.

The data processing system 102 can include the data repository 128. The data repository 128 can include one or more local or distributed databases and can include a database management system. The data repository 128 can include computer data storage or memory and can store one or more regular expressions 130, one or more parameters 132, one or more policies 134, response data 136, and templates 138, among other data. The parameters 132, policies 134, and templates 138 can include information such as rules about a voice based session between the client devices 104 and the data processing system 102. The regular expressions 130 can include rules about when the voice-based session between the client devices 104 and the data processing system 102 is to include the agent application 112 and the agent service 106. The regular expressions 130, parameters 132, policies 134, and templates 138 can also include information for another digital assistant application 108 received via the interface 114 from another source (e.g., the data processing system 102 and the client devices 104). The response data 136 can include content items for audio output or associated metadata, as well as input audio messages that can be part of one or more communication sessions with the client devices 104.

The data processing system 102 can include at least one computation resource or server. The data processing system 102 can include, interface, or otherwise communicate with at least one interface 114. The data processing system 102 can include, interface, or otherwise communicate with at least one instance of the digital assistant application 108 on the data processing system 102. The instance of the digital assistant application 108 on the data processing system 102 can include, interface, or otherwise communicate with at least one NLP component 118, at least one audio signal generator component 120, and at least one direct action handler component 122. The data processing system 102 can include, interface, or otherwise communicate with at least one response selector component 124. The data processing system 102 can include, interface, or otherwise communicate with at least one data repository 128. The at least one data repository 128 can include or store, in one or more data structures or databases, regular expressions 130, parameters 132, policies 134, response data 136, and templates 138. The data repository 128 can include one or more local or distributed databases, and can include a database management. The components of the data processing system 102 can each include at least one processing unit or other logic device such as a programmable logic array engine or module configured to communicate with the database repository 128 or 148. The components of the data processing system 102 can be separate components, a single component, or part of multiple data processing systems 102. The system 100 and its components, such as a data processing system 102, can include hardware elements, such as one or more processors, logic devices, or circuits.

The data processing system 102 can include an interface 114. The interface 114 can be configured, constructed, or operational to receive and transmit information using, for example, data packets. The interface 114 can receive and transmit information using one or more protocols, such as a network protocol. The interface 114 can include a hardware interface, software interface, wired interface, or wireless interface. The interface 114 can be a data interface or a network interface that enables the components of the system 100 to communicate with one another. The interface 114 of the data processing system 102 can provide or transmit one or more data packets that include the action data structure, audio signals, or other data via the network 116 to the client devices 104 or the agent service 106. For example, the data processing system 102 can provide the output signal from the data repository 128 or from the audio signal generator component 120 to the client devices 104.

The data processing system 102 can also instruct, via data packet transmissions, the client devices 104 to perform the functions indicated in the action data structure. The output signal can be obtained, generated, transformed to, or transmitted as one or more data packets (or other communications protocol) from the data processing system 102 (or other computing device) to the client devices 104. The interface 114 can facilitate translating or formatting data from one format to another format. For example, the interface 114 can include an application programming interface ("API") that includes definitions for communicating between various components, such as software components. An application, script, program, or other components that are associated with the data processing system 102 can be installed at the client devices 104. The application can enabled the client devices 104 to communicate input audio signals (and other data) to the interface 114 of the data processing system 102.

The data processing system 102 can include an application, script, or program installed at the client device 104, such as the instance of the digital assistant application 108 on the client device 104 to communicate input audio signals to the interface 114 of the data processing system 102 and to drive components of the client computing device to render output audio signals or visual output. The data processing system 102 can receive data packets, a digital file, or other signals that include or identify an input audio signal (or input audio signals). The client device 104 can detect the audio signal via the speaker 154 and convert the analog audio signal to a digital file via an analog-to-digital converter. For example, the audio driver can include an analog-to-digital converter component. The pre-processor component can convert the audio signals to a digital file that can be transmitted via data packets over network 116.

The instance of the digital assistant application 108 of the data processing system 102 can execute or run an NLP component 118 to receive or obtain the data packets including the input audio signal detected by the microphone 156 of the client device 104. The data packets can provide a digital file. The NLP component 118 can receive or obtain the digital file or data packets comprising the audio signal and parse the audio signal. For example, the NLP component 118 can provide for interactions between a human and a computer. The NLP component 118 can be configured with techniques for understanding natural language and enabling the data processing system 102 to derive meaning from human or natural language input. The NLP component 118 can include or be configured with techniques based on machine learning, such as statistical machine learning. The NLP component 118 can utilize decision trees, statistical models, or probabilistic models to parse the input audio signal. The NLP component 118 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 118 can convert the input audio signal into recognized string by comparing the input signal against a stored, representative set of audio waveforms (e.g., in the data repository 128) and choosing the closest matches. The set of audio waveforms can be stored in data repository 128 or other database accessible to the data processing system 102. The representative waveforms are generated across a large set of users, and then may be augmented with speech samples from the user. After the audio signal is converted into recognized text, the NLP component 118 matches the text to words that are associated, for example via training across users or through manual specification, with actions that the data processing system 102 can serve. The NLP component 118 can determine that the input audio signal acquired from the microphone 156 does not contain any recognizable strings. The NLP component 118 can determine that the input audio signal contains silence (e.g., with a maximum amplitude of less than 0 dB) in determining that the input audio signal does not contain any recognizable strings. Additionally, the NLP component 118 can determine a signal-to-noise (SNR) of the input audio signal. The NLP component 118 can compare the SNR of the input audio signal to a threshold SNR (e.g., −20 dB). Responsive to the determination the SNR of the input audio signal is greater than the threshold SNR, the NLP component 118 can determine that the input audio signal does not contain any recognizable strings.

The data processing system 102 can receive image or video input signals, in addition to, or instead of, input audio signals. The NLP component 118 can convert image or video input to text or digital files. The NLP component 118 can process, analyze, or interpret image or video input to perform actions, generate requests, or select or identify data structures. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 118) can be configured with the imaging techniques, in addition to, or instead of, audio processing techniques.

The NLP component 118 can obtain the input audio signal from the microphone 156 of the client device 104. The NLP component 118 can partition or divide the input audio signal into one or more audio segments of a time duration (e.g., 15 seconds to 2 minutes) to process each segment. From the input audio signal, the NLP component 118 can identify at least one request, at least one trigger keyword corresponding to the request, and one or more entities. The request can indicate intent, digital components, or subject matter of the input audio signal. The trigger keyword can indicate a type of action likely to be taken. For example, the NLP component 118 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 118 can parse the input audio signal to identify, determine, retrieve, or otherwise obtain the request and the trigger keyword. For instance, the NLP component 118 can apply a semantic processing technique to the input audio signal to identify the trigger keyword or the request. The NLP component 118 can apply the semantic processing technique to the input audio signal to identify a trigger phrase that includes one or more trigger keywords, such as a first trigger keyword and a second trigger keyword. For example, the input audio signal can include the sentence "Play my favorite song." The NLP component 118 can determine that the input audio signal includes a trigger keyword "play." The NLP component 118 can determine that the request is for the end user's favorite song (a digital component).

The NLP component 118 can determine whether one or more strings (e.g., words or phrases) identified from the input audio signal references one of the agent applications 112. Each string can include a word or a phrase (e.g., multiple words). At least one of the strings can include the trigger keyword. At least one of the strings can include the keyword phrase. The one or more strings identified from the input audio signal can include an agent identifier. The agent identifier can indicate which agent application 112 the end user would like to carry out the request. For example, the input audio signal can include "Play song ABC from music service X." In this input audio signal, the phrase "music service X" can be the agent identifier for an agent application 112 that is a subscription-based music service. The NLP component 118 can identify the agent identifier from the one or more strings of the input audio signal. Based on the input audio signal including the agent identifier, the NLP component 118 can determine that the input audio signal references the agent application 112. The NLP component 118 can determine that none of the strings references the agent application 112, in response to determining that none of the strings in the input audio signal includes the agent identifier.

The NLP component 118 can determine whether one or more strings identified from the input audio signal references a function of at least one of the agent applications 112. The one or more strings can include the trigger keyword or the keyword phrase. The trigger keyword or the keyword phrase can reference the function of at least one of the agent applications 112. The trigger keywords or the keyword phrases referencing the function at least one of the agent applications 112 can be defined using the regular expression 130 (sometimes referred to as a format). The agent identified for the agent application 112 can be defined using the regular expression 130. The regular expression 130 may include a set of predefined keywords for a function can be configured by the agent service 106. The set of predefined keywords can include a function identifier (e.g., "ride" or "play"). The set of predefined keywords can also be maintained on the data repository 128 of the digital assistant application 108. For example, the input audio signal can include the sentence "Get me a ride home." The set of predefined keywords for connecting with driver of a ridesharing application can include "ride" or "take me to," among others. The NLP component 118 can identify the trigger keyword "ride," and can determine that the audio input signal contains keywords referencing the function of the agent application 112. The NLP component 118 can compare the one or more keywords identified from the input audio signal with the regular expression 130 for the function of the agent application 112. The NLP component 118 can determine a match between at least one string of the input audio signal with the regular expression 130 for the function of the agent application 112. Based on the match, the NLP component 118 can associate the at least one key word to a function identifier corresponding to the function of the agent application 112.

Based on the match, the NLP component 118 can determine that the input audio signal references the agent application 112 and the function of the agent application 112. In response to determining that the input audio signals references the function of the agent application 112, the NLP component 118 can also identify one or more parameters from the strings of the input audio signal for the function. In the previous example, the word "home" in "Get me a ride home" can be identified as one of the parameters for the function. The NLP component can determine a match between at least one string with the regular expressions 130 for the function of multiple agent applications 112. Which of the multiple agent applications 112 is selected can be determined based on an operational status of each agent service 106 as determined by the agent evaluator 110, as detailed herein below. Based on no match, the NLP component 118 can determine that the input audio signal does not reference any of the functions of the agent application 112.

The interface 114 can control whether the agent application 112 or the agent service 106 is permitted to access the input audio signals acquired via the microphone 156 of the client device 104. The microphone 156 can have a microphone status. The microphone status can indicate whether the digital assistant application 108 or the agent application 112 have access to the audio data acquired via the microphone 156. The microphone status can include an enabled state and a disabled state. The enabled state for the microphone 156 can indicate that the digital assistant application 108 or the agent application 112 can access and receive the audio data acquired via the microphone 156. In the enabled state, the interface 114 can permit sending or provision of the audio data acquired from the microphone 156 and processed by the digital assistant application 108 to the agent service 106 or the agent application 112. The audio data can include any information related to the input audio signal acquired by the microphone 156 of the client device 104. The audio data can include the input audio signal sampled using the audio driver of the client device 104. The audio data can also include the one or more strings parsed by the NLP component 118 from the input audio signal. On the other hand, the disable state for the microphone 156 can indicate that the agent application 112 may not access or receive the audio data acquired via the microphone 156. In the disabled state, the interface 114 can restrict sending or provision of any audio data acquired form the microphone 156 and processed by the digital assistant application 108 to the agent service 106 or the agent application 112.

The interface 114 can set the microphone status of the microphone 156 based on the input audio signal processed by the NLP component 118. Responsive to determining that the input audio signal references the agent application 112, the interface 114 can set the microphone status of the microphone 156 to enabled. With the microphone status of the microphone 156 set to enabled, the interface 114 permit the agent service 106 or the agent application 112 access to the audio data. The interface 114 can set the microphone status of the microphone 156 based on a deactivate command from the agent application 112. The deactivate command can specify that the microphone status of the microphone 156 is to be set to disabled. The agent application 112 can be configured to send the deactivate command to the interface 114 and the digital assistant application 108 via the API (e.g., a function call). While the microphone status is set to enabled, the interface 114 can receive the deactivate command from the agent application 112. Responsive to the receipt of the deactivate command, the interface 114 can set the microphone status of the microphone 156 to disabled to restrict the agent service 106 or the agent application 112 access to the audio data acquired from the microphone 156.

The data processing system 102 can execute or run an instance of the direct action handler component 122. The direct action handler component 122 can execute scripts or programs based on input received from the NLP component 118. The agent service 106 can provide the scripts or programs. The agent service 106 can make the scripts or programs available to the data processing system 102 through an API. The direct action handler component 122 can determine parameters or responses to input fields and can package the data into an action data structure. The action data structure can be provided to the data processing system 102 through the API. The direct action handler component 122 can transmit the action data structure to the agent service 106 for fulfillment or the data processing system 102 can fulfill the action data structure.

The direct action handler component 122 can generate or select, based on the request or the trigger keyword identified in an input audio signal, data structures for the actions of a thread or conversation. Based on the request parsed by the NLP component 118, the direct action handler component 122 can determine to which of a plurality of agent services 106 the message should be sent. As described above the NLP component 118 can determine that the input audio signal references the agent application 112 or the function of the agent application 112. The direct action handler component 122 can determine that the input audio signal includes a request for an explicit agent service 106 (e.g., "Order a car with Car Service XYZ," where the request specifically requests the request be fulfilled by Car Service XYZ) or can select from a plurality of agent services 106 can fulfill the request. The direct action handler component 122 can select one agent service 106 from the plurality of agent services 106 based on the operational status of each agent service 106 as determined by the agent evaluator 110, as described herein below.

The direct action handler component 122 can package the request into an action data structure for transmission as another request (also sometimes referred herein as an input) to the agent service 106. The direct action handler component 122 can transmit the request to the agent service 106 for the agent application 112. The direct action handler component 122 can also invoke or call the agent application 112 using the request. The request can be generated in accordance with the Hypertext Transfer Protocol (HTTP). The request can include a header and a body. The header of the request can include one or more fields and the body of the request can include the action data structure. The header can also include a device modality (e.g., a smartphone, smart speaker, tablet, laptop, and desktop) of the client device 104 executing the digital assistant application 108 and the agent application 112. The action data structure can include information for completing the request, such as the function identifier and the one or more parameters of the function corresponding to the function identifier for the agent application 112 to fulfill. The information can be data that the agent service 106 uses to complete the request. Continuing the above example for a car service request, the information can include a pick up location and a destination location. The direct action handler component 122 can retrieve a template 138 from the data repository 128 to determine which fields to include in the action data structure. The direct action handler component 122 can retrieve content from the data repository 128 to obtain information for the fields of the data structure. The direct action handler component 122 can populate the fields from the template with that information to generate the data structure. The direct action handler component 122 can also populate the fields with data from the input audio signal or previous input audio signals. The templates 138 can be standardized for categories of agent applications 112, or can be standardized for specific agent services 106. For example, ride sharing agent services 106 can use the following standardized template 138 to create the data structure: {client_deviceidentifier; authentication_credentials; pick_uplocation; destination_location; no_passengers; service_level}. The standardized template 138 can also include the function identifier and one or more parameters identified in the input audio signal.

The direct action handler component 122 can expand responses or entities contained in the responses. The direct action handler component 122 can expand entities that the NLP component 118 identifies in the input audio signal. The direct action handler component 122 can expand the entities to convert the entities into a format that the agent service 106 requires for a given field of the action data structures for the agent service 106. The entities can include information that may be ambiguous or unclear to the agent service 106. For example, when the agent service 106 requested a street address, the end user may provide an entity that is the proper name of a location or business. The direct action handler component 122 can automatically generate the expanded entity based on content or preferences the data processing system 102 received from the client device 104. The direct action handler component 122 can generate the expanded entity based on content or preferences the data processing system 102 requests from the client device 104 in a subsequent audio-based input request. For example, the data processing system 102 can receive an input audio signal that includes "Ok, request a car service to pick me up at home." The NLP component 118 can identify the term "home" as an entity that the agent service 106 cannot recognize. For example, the NLP component 118 can identify "home" as a location entity as one of the one or more parameters for the function; however, the location field in the action data structure can specify for inclusion of a street address, city, state, and zip code. In this example, the "home" location entity is not in the format requested by the agent service 106. When the end user of the client device 104 previously provided the data processing system 102 with the end user's home address, the direct action handler component 122 can expand "home" into the format requested by field of the service provider device's action data structure (e.g., {street_address:"123 Main St.", city:"Anytown", state:"CA"}). If the end user did not previously provide the data processing system 102 with the end user's home address, the data processing system 102 can generate and transmit an audio-based input request that requests the end user indicate a specific address rather than "home." Expanding the entity prior to transmitting the entity to the agent service 106 can reduce the number of required network transmission because the agent service 106 may not need to request clarifying or additional information after receiving the unexpanded entity.

In addition, with the determination that the input audio signal (or segment) from the microphone 156 lacks any recognizable strings, the direct action handler component 122 can provide an empty action data structure to the agent application 112. The direct action handler component 122 can set the fields of the empty action data structure to empty or null fields (e.g., the fields in the template 138). The direct action handler component 122 can include a null marker to indicate that the action data structure corresponds to an input audio signal that lacks any recognizable strings. The direct action handler component 122 can send or provide the empty action data structure to the agent application 112.

The agent service 106 for the agent application 112 can receive the request from the direct action handler component 122 via the network 116. The request can include the action data structure. The agent service 106 can parse the request to identify the action data structure included in the request from the direct action handler component 122 in accordance to the template 138. The agent service 106 can also have a copy of the template 138. By applying the template 138, the agent service 106 can determine whether the request is valid. In response to the determination that the request is valid, the agent service 106 can identify one or more fields, such as the function identifier and the one or more parameters for the function from the action data structure of the request. The agent service 106 can identify the function corresponding to the function identifier. The agent service 106 can execute or carry out the function corresponding to the function using the one or more parameters from the action data structure of the request. For example, if the request from the direct action handler component 122 is to play a specified song, the agent service 106 can access an audio database to retrieve an audio file corresponding to the specified song. If the request from the direct action handler component 122 is for a ridesharing request, the agent service 106 can identify one or more available vehicles in the location identifier in the request and can send a notification to a computing device for one of the available vehicles (e.g., a smartphone) to request ridesharing.

In carrying out the function, the agent service 106 can generate a response to the request. The agent service 106 can package the response into an action data structure for transmission to the digital assistant application 108. The response can be generated in accordance with HTTP. The response can include a header and a body. The header of the response can include one or more fields and the body of the response can include the action data. The action data structure can include an indicator for success or failure in carrying out the function. The action data structure can include a response phrases with one or more words for display or for an output audio signal. Based on the execution of the function, the agent service 106 can identify which indicator and which response phrase to include the response to the request from the digital assistant application 108. The agent service 106 can transmit or provide the response to the digital assistant application 108.

Additionally, with the microphone status of the microphone 156 set to enabled, the agent service 106 or the agent application 112 can continue to access the audio data acquired via the microphone 156 of the client device 104. The agent application 112 can interface via the interface 114 with the various components of the digital assistant application 108 (e.g., using the API) to access the audio data acquired subsequent to the request to carry out further requests. The agent application 112 can access or retrieve the input audio signal acquired by the microphone 156 through the digital assistant application 108 subsequent to the initial request. The agent application 112 can access or retrieve the one or more strings parsed by the NLP component 118 from the input audio signal. The agent application 112 can invoke the NLP component 118 (e.g., using the API) to obtain the one or more strings parsed from subsequent input audio signals (or segments). The agent application 112 can also access or retrieve the action data structure generated by direct action handler component 122 from the one or more strings parsed from the input audio signal. The agent application 112 can invoke the direct action handler component 122 to generate the action data structure based on subsequently parsed strings from the input audio signal. In this manner, the agent application 112 can continue to carry out requests indicated in the input audio signal acquired from the microphone 156.

Subsequent to or in conjunction with the sending of the response, the agent application 112 can send a deactivate command to the digital assistant application 108 or the interface 114. The deactivate command can specify that the microphone status of the microphone 156 is to be set to disabled. The deactivate command can include a time duration to specify that the microphone status is to be set to disabled after elapsing of a time duration (e.g., 10 seconds to 3 minutes). The agent application 112 can be configured to send the deactivate command to the interface 114 and the digital assistant application 108 via the API (e.g., a function call). Responsive to the receipt of the deactivate command, the interface 114 can set the microphone status of the microphone 156 to disabled to restrict the agent service 106 or the agent application 112 access to the audio data acquired from the microphone 156. The interface 114 can also maintain a timer to count a time elapsed from receipt of the deactivate command. The interface 114 can compare the elapsed time to the time duration specified by the deactivate command. The interface 114 can determine that the elapsed time is greater than the specified time. Responsive to the determination, the interface 114 can set the microphone status of the microphone 156 to disabled to restrict access of the agent application 112 or the agent service 106 to the audio data acquired from the microphone 156.

The agent application 112 can also send an activation command to the digital assistant application 108 or to the interface in conjunction or subsequent to the sending of the response. The activate command can specify that the microphone 156 is to be maintained or set to be enabled. The activate command can include a time duration to specify that the microphone status is to be set to disabled after elapsing of a time duration (e.g., 10 seconds to 3 minutes). The agent application 112 can be configured to send the activate command to the interface 114 and the digital assistant application 108 via the API (e.g., a function call), independently or in addition to the invocation of the agent application 112 by the digital assistant application 108. Responsive to the receipt of the activate command, the interface 114 can set the microphone status of the microphone 156 to enabled to permit the agent service 106 or the agent application 112 access to the audio data acquired from the microphone 156. The interface 114 can also maintain a timer to count a time elapsed from receipt of the activate command. The interface 114 can compare the elapsed time to the time duration specified by the activate command. The interface 114 can determine that the elapsed time is greater than the specified time. Responsive to the determination, the interface 114 can set the microphone status of the microphone 156 to disabled to restrict access of the agent application 112 or the agent service 106 to the audio data acquired from the microphone 156.

Responsive to the receipt of the response from the agent service 106, the audio generator component 120 can parse the response to identify the action data structure. From the action data structure, the audio generator component 120 can identify the one or more keywords of the response phrase. The audio generator component 120 can generate an output audio file based on the one or more words of response phrase in the response from the agent service 106. The audio generator component 120 can play (e.g., via the speaker 154) the output audio file of the one or more words of the response phrase from the agent service 106 in carrying out the function of the agent application 112. For example, the audio generator component 120 can play the response phrase for a ridesharing service, "Ride home is en route in five minutes." The digital assistant application 108 can also display the one or more words of the response phrase. The digital assistant application 108 can also forward the response from the agent service 106 to the agent evaluator 110, the functionalities of which are detailed herein below.

The response selector component 124 can obtain information from the data repository 128 where the information can be stored as part of the response data 136. The response selector component 124 can query the data repository 128 to select or otherwise identify response phrases e.g., from the response data 136, for an output audio signal. The response selector component 124 can be invoked to select one of the response phrases in the response data 136 by the NLP component 118 and the direct action handler component 122, responsive to the determination that the input audio signal does not reference any agent application 112 or any function of the agent applications 112. The direct action handler component 122 can package the request into an action data structure for transmission as a message to the response selector component 124. The direct action handler component 122 can obtain response data 136 (or parameters 132 or policies 134) from the data repository 128, as well as data received with end user consent from the client devices 104 to determine location, time, user accounts, and logistical or other information in order to reserve a car from the car share service. The response data 136 (or parameters 132 or policies 134) can be included in the action data structure. When the content included in the action data structure includes end user data that is used for authentication, the data can be passed through a hashing function before being stored in the data repository 128. The audio signal generator component 120 can generate or otherwise obtain an audio output signal that includes the response data 136. The data processing system 102 can execute the audio signal generator component 120 to generate or create an output signal corresponding to the response data 136. For example, once a request is fulfilled, the audio signal generator component 120 can generate an audio output signal that includes the phrase "The action was completed."

The agent evaluator 110 can be invoked by the digital assistant application 108 or another component of the data processing system 102. The agent evaluator 110 can be invoked or can run as the digital assistant application 108 and the agent application 112 communicate with each other. Responsive to the determination that the input audio signal references the agent application 112, the direct action handler component 122 can provide or transmit the action data structure generated from the request to the agent evaluator 110 to invoke the agent evaluator 110. The provision of the action data structure to the agent evaluator 110 can be prior to, concurrent with, or subsequent to the provision of the action data structure to the agent service 106. In response to the receipt of the action data structure from the direct action handler component 122, the agent evaluator 110 can perform the functionalities of the exchange logger component 140, the sequence analyzer component 142, the microphone use detector component 144, the extrusion detector component 146, and the agent manager component 148, among others. The agent service 106 or the agent application 112 can send the response to the agent evaluator 110, in response to the request from the digital assistant application 108. In response to the receipt of the response from the agent service 106 or the agent application 112, the agent evaluator 110 can perform the functionalities of the exchange logger component 140, the sequence analyzer component 142, the microphone use detector component 144, the extrusion detector component 146, and the agent manager component 148, among others.

The agent evaluator 110 can be invoked or can run, independent of the communication between the digital assistant application 108 and the agent application 112. The agent evaluator 110 can also be invoked in response to a request to test the agent application 112 to detect potential or attempted extrusion of audio data from the digital assistant application 108. The request can identify which agent application 112 to test (e.g., using an identifier for the agent application 112). Responsive to the receipt of the request, the agent evaluator 110 can perform the functionalities of the exchange logger component 140, the sequence analyzer component 142, the microphone use detector component 144, the extrusion detector component 146, and the agent manager component 148, among others. The agent evaluator 110 can also perform the functionalities of the exchange logger component 140, the sequence analyzer component 142, the microphone use detector component 144, the extrusion detector component 146, and the agent manager component 148 in accordance to a predetermined schedule. The predetermined schedule can specify a set of times (e.g., intervals of every 15 minutes or 1 day).

The agent evaluator 110 on the data processing system 102 can execute the exchange logger component 140. The exchange logger component 140 can maintain the I/O record 152 for each agent service 106 on the data repository 150 (sometimes referred herein as a log database). The I/O record 152 can include communications exchanged in the digital assistant application 108 interfacing with the agent application 112. The communications can include inputs (e.g., requests) from the digital assistant application 108 and outputs (e.g., responses) from the agent application 112, when interfacing with the digital assistant application 108. The I/O record 152 can be for a particular agent application 112. The I/O record 152 can be for a particular client device 104 or across multiple client devices 104 running the digital assistant application 108 and the agent application 112. The I/O record 152 can include sample inputs and outputs generated for testing the agent application 112 in a sandbox environment.

The I/O record 152 can include an input log for communications from the digital assistant application 108 to the agent application 112. The input log can include one or more inputs sent from the digital assistant application 108 to the agent application 112. At least one input can include a request generated by the NLP component 118 parsed from a corresponding input audio signal acquired from the microphone 156. The request can be determined to reference a function of the agent application 112, and sent to the agent application 112 of the agent service 106 to fulfill the function indicated in the request. Each input can include a set of strings from the digital assistant application 108. Each string can include a word or phrase (e.g., multiple words) in natural language form as parsed from the corresponding input audio signal by the NLP component 118. The set of strings can be null, indicating a lack of strings (e.g., words or phrase) parsed from the input audio signal. The input can include a null marker when the set of strings is determined to be null. The input log can also include or identify a timestamp for each input from the digital assistant application 108 to the agent application 112. The input log can include the one or more action data structures generated by the direct action handler component 122.

The I/O record 152 can include an output log for responses from the agent application 112 interfacing with the digital assistant application 108. The output log can include one or more inputs sent from the agent application 112 to the digital assistant application 108. At least one output can include a response generated by the agent application 112 generated in response to the request from the digital assistant application 108. At least one output can include a response phrase selected and generated by the response selector component 124 using data provided by the agent application 112. Each output can include a set of strings from the agent application 112. The set of strings from the agent application 112 can include the response phrase selected and generated by the response selector component 124 using data provided by the agent application 112. The output log can also include or identify a timestamp for each output from the agent application 112 to the digital assistant application 108. The output log can be part of the input log, with each input labeled with an input indicator and each output labeled with an output indicator.

The I/O record 152 can include a microphone state log of the microphone 156 used in the communications between the digital assistant application 108 and the agent application 112. The microphone state log can include one or more microphone statuses of the microphone 156 in the interfacing of the agent application 112 with the digital assistant application 108. Each microphone status recorded on the microphone state log can be one of the enabled state or the disabled state. The microphone state log can include the microphone status of the microphone 156 for each input or output of the I/O record 152. The microphone state log can include also include a timestamp for each microphone status. The timestamp of the microphone state log can differ from the timestamp of the input or the timestamp of the output. For example, the microphone status may have changed sometime after receipt of the output from the agent application 112. The microphone state log can be part of the input log or the output log of the I/O record 152. For each input, the input log can include the microphone status of the microphone 156 concurrent or subsequent to receipt of the input. For each output, the output log can include the microphone status of the microphone 156 concurrent or subsequent to the output.

In maintaining the I/O record 152, the exchange logger component 140 can write or record onto the input log of the I/O record 152 on the data repository 150 using the inputs communicated from the digital assistant application 108 to the agent application 112. To record the inputs, the exchange logger component 140 can identify the input from the digital assistant application 108 to the agent application 112. In response to the determination by the NLP component 118 that the input audio signal references one of the functions of the agent application 112, the exchange logger component 140 can identify the set of strings parsed from the input audio signal. The exchange logger component 140 can also identify the set of strings responsive to identifying that the microphone 156 of the client device 104 running the digital assistant application 108 is set to enabled. The set of strings can be null (e.g., lacking any recognizable strings) or can include at least one word or phrase. The exchange logger component 140 can also identify a timestamp of receipt of the input audio signal from the microphone 156. The exchange logger component 140 can identify the action data structure generated by the direct action handler component 122 using the input audio signal. The exchange logger component 140 can identify the device modality of the client device 104 running the digital assistant application 108 and the agent application 112 from the action data structure. Based on the identifications, the exchange logger component 140 can package the input into an entry of the input log of the I/O record 152. The exchange logger component 140 can insert or include the set of strings, the timestamp, the device modality, or the action data structure in the input. Responsive to determining that the set of strings is null, the exchange logger component 140 can also include a null marker into the entry for the input in the input log. The null marker can indicate that the input audio signal lacks any recognizable strings. The exchange logger component 140 can append the input into the input log of the I/O record 152 subsequent to the previously received input.

The exchange logger component 140 can also write or record onto the output log of the I/O record 152 on the data repository 150 using the outputs communicated from the agent application 112 to the digital assistant application 108. To record the outputs, the exchange logger component 140 can identify the output from the agent application 112 to the digital assistant application 108. In response to receipt of the response from the agent service 106 or the agent application 112, the exchange logger component 140 can identify the set of strings in the response from the agent service 106 or the agent application 112. The exchange logger component 140 can also identify the set of strings in the response phrase generated by the response selector component 124. The exchange logger component 140 can also identify a timestamp of receipt of the response from the agent service 106 or the agent application 112. Based on the identifications, the exchange logger component 140 can package the output into an entry of the output log of the I/O record 152. The exchange logger component 140 can insert or include the set of strings, the timestamp, the response, the response phrase into the output. The exchange logger component 140 can append the output into the output log of the I/O record 152 subsequent to the previously received output.

In addition, the exchange logger component 140 can write or record onto the microphone state log of the I/O record 152 on the data repository 150 using the microphone statuses in interfacing between the digital assistant application 108 and the agent application 112. The exchange logger component 140 can monitor a change or setting of the microphone status of the microphone 156 by the interface 114 in the interfacing between the digital assistant application 108 and the agent application 112. In response to detecting that the setting of the microphone status, the exchange logger component 140 can identify the microphone status of the microphone 156. The exchange logger component 140 can detect the interface 114 setting the microphone status of the microphone 156 to enabled responsive to determining that the input audio signal references one of the functions of the agent application 112. The exchange logger component 140 can identify a timestamp of the setting of the microphone status to enabled in response to the detection of the setting. The exchange logger component 140 can detect the interface 114 setting the microphone status to disabled responsive to the receipt of the deactivate command or the activate command from the agent application 112 (e.g., via the API). The exchange logger component 140 can identify a timestamp of the setting of the microphone status to disabled in response to the detection of the setting. The exchange logger component 140 can identify the time duration specified by the activate or deactivate command. The time duration can indicate an amount of time that the microphone status is to be held in the enabled state subsequent to receipt of the deactivate or activate command from the agent application 108.

The exchange logger component 140 can include or insert an entry of the microphone state log of the I/O record 152. The exchange logger component 140 can insert the microphone status, the timestamp, and the specified time duration into the microphone state log. The exchange logger component 140 can identify an input or an output directly prior to the setting of the microphone status of the microphone 156. The exchange logger component 140 can insert or include the microphone status into the entry of the identified input into the input log of the I/O record 152. The exchange logger component 140 can insert or include the microphone status into the entry of the identified output of the output log of the I/O record 152. The microphone status included into the entry of the output log can be the same or can differ of the entry of the input log. The exchange logger component 140 can append the microphone status into the microphone state log of the I/O record 152 subsequent to the previously detected microphone status of the microphone 156.

The exchange logger component 140 can access the data repository 150 to identify the I/O record 152. The exchange logger component 140 can identify the input log of the I/O record 152. For each input of the input log, the exchange logger component 140 can identify the set of strings, the timestamp, the device modality of the client device 104, and the action data structure for the input corresponding to the input audio signal acquired via the microphone 156. The exchange logger component 140 can also identify the null marker from the input in the input log. The exchange logger component 140 can identify the output log of the I/O record 152. For each output of the output log, the exchange logger component 140 can identify the set of strings, the timestamp, the response, the device modality of the client device 104, and the response phrase from the agent service 106 or the agent application 112. The exchange logger component 140 can identify the microphone state log of the I/O record 152. From each entry in the microphone state log, the exchange logger component 140 can identify the microphone status of the microphone 156 and the timestamp.

The agent evaluator 110 on the data processing system 102 can execute the sequence analyzer component 142. The sequence analyzer component 142 can assess the input log and the output log of the I/O record 152. By assessing the strings in the input and the output, the sequence analyzer component 142 can determine a classification for the inputs and outputs. The classification can be a sentence type for the set of strings in the input or the output, and can include a terminal statement, an anticipatory statement, and an expectative statement, among others. The terminal statement can indicate to a recipient end user to not expect any more additional, follow-up statements from the agent application 112. Examples of terminal statements can include "Restaurant 'ABC' ahead", "Low chance of rain is low", and "Playing Song 'x'", among others. The anticipatory statement can indicate to the recipient end user to expect additional, follow-up statements from the agent application 112. Examples of anticipatory statements can include "Would you like more?", "Please provide more information", and "I didn't quite get that," among others. The expectative statement can indicate that the speaking end user awaits for a continuation of the conversation with the agent application 112. Examples of expectative statements can include "Show me restaurants in the area", "Find songs from the 80s", and "What's in my schedule?", among others. An expectative statement in an input from the digital assistant application 108 can indicate that the subsequent output is to be an anticipatory statement from the agent application 112. By assessing the strings in the inputs or the outputs, the sequence analyzer component 142 can determine the classification for the input or the output in the I/O record 152.

The sequence analyzer component 142 can establish and maintain an I/O exchange model to correlate strings communicated between the digital assistant application 108 and the agent application 112 as one of terminal, anticipatory, and expectative statements. The I/O exchange model can be stored and maintained on the data repository 150. The I/O exchange model can be an artificial neural network (ANN), a support vector machine (SVM), a Naïve Bayes classifier, a Bayesian model, a Markov model, and a regression model (linear or logistic), among others, and can be trained according to the type of model. The I/O exchange model can include a set of inputs, a set of outputs, and a set of weights. The set of inputs can include sets of strings and an indicator of whether the set of strings is an input or an output, among others. The set of outputs can include confidence metrics each indicating a likelihood that the set of strings is classified as one of a terminal, anticipatory, or expectative statement. The set of weights can correlate the set of strings and the indicator with the confidence metrics each indicating the likelihood that the set of strings is classified as one of a terminal, anticipatory, or expectative statement.

The sequence analyzer component 142 can train the I/O exchange model using a training dataset. The training dataset can include sample strings for inputs and outputs. Each sample string in the training dataset can be labeled or indicated as a terminal, anticipatory, or expectative statement. The training dataset can also include sample pairs of strings for inputs and outputs. The input or the output in each sample pair of strings can be labeled or indicated as terminal, anticipatory, or expectative statement. An example of pair of strings with the output labeled as a terminal response can include an input of "Play Song X" and an output of "Playing." An example of a pair of strings with the output labeled as an anticipatory response can include an input of "Find me a café" and an output of "There are three coffee shops nearby. Would you like to find more?" An example of a pair of strings with the input labeled as expectative query can include "Get me paths home" and an output of "there are three ways to your destination." The training dataset can include indicators specifying whether the set of string is an input or an output. The training dataset can include the device modality for client devices 104 associated with the strings. For example, a pair of strings can be specified as anticipatory when the client device 104 is a smartphone, where as a pair of strings can be specified as terminal when the client device 104 is a smart speaker. In this manner, the training dataset can take account of the expectations and assumptions of end users of client devices 104 with interacting with the digital assistant application 108 and the agent application 112. In training the I/O exchange model, the sequence analyzer component 142 can apply the strings and indicators from the training dataset onto the inputs of the I/O exchange model. The sequence analyzer component 142 can generate or obtain the confidence metrics calculated using the I/O exchange model. The sequence analyzer component 142 can compare the confidence metrics with the labeling of the strings as one of a terminal, anticipatory, or expectative statement as specified in the training dataset. Based on the comparison, the sequence analyzer component 142 can adjust, modify, or otherwise set the weights of the I/O exchange model. The sequence analyzer component 142 can repeat the training of the I/O exchange model until convergence.

The sequence analyzer component 142 can identify one or more pairs of an input from the input log and an output from the output log of the I/O record 152. In identifying the pairs of inputs and outputs, the sequence analyzer component 142 can traverse the I/O record 152 to identify the one or more pairs of the input and the output. While traversing, the sequence analyzer component 142 can identify each input from the input log of the I/O record 152. For each input, the sequence analyzer component 142 can identify the timestamp of the receipt of the input from the digital assistant application 108 to the agent application 112. In conjunction, the sequence analyzer component 142 can identify each output from the output log of the I/O record 152. For each output, the sequence analyzer component 142 can identify the timestamp of the receipt of the output from the agent application 112 to the digital assistant application 108. The sequence analyzer component 142 can compare the timestamps of the inputs to the timestamps of the outputs. From traversing the I/O record 152, the sequence analyzer component 142 can find or identify the timestamp of the output subsequent to the timestamp of the input. The sequence analyzer component 142 can identify the input and the output received subsequent to the input as a pair of the input and the output. The sequence analyzer component 142 can identify the set of strings included in the input in the input log of the I/O record 152. The sequence analyzer component 142 can identify the set of strings included in the output in the output log of the I/O record 152.

Between the pair of an input and an output, the sequence analyzer component 142 can classify or determine the input or the output based on the set of strings of the input and on the set of strings of the output. As discussed above, the classifications can include terminal, anticipatory, and expectative statements, among others. The sequence analyzer component 142 can apply the set of strings of the input, the set of strings of the output, and indicators that the strings are input and output respectively to the inputs of the I/O exchange model. The sequence analyzer component 142 can also apply the device modality of the client device 104 as indicated in the input or the output. The I/O exchange model can generate or determine a confidence metric indicating a likelihood that the output is a terminal statement, a confidence metric indicating a likelihood that the output is an anticipatory statement, and a confidence metric indicating a likelihood that the input is an expectative statement. The input or output can be classified as one or more of the types of statements (e.g., terminal, anticipatory, and expectative) based on the confidence metrics determined by the I/O exchange model. The sequence analyzer component 142 can compare the confidence metric indicating that the likelihood that the output is a terminal statement to a threshold metric.

Responsive to a determination that the confidence metric is greater than the threshold metric, the sequence analyzer component 142 can determine that the output is a terminal statement. On the other hand, responsive to a determination that the confidence metric is less than or equal to the threshold metric, the sequence analyzer component 142 can determine that the output is a terminal statement. The sequence analyzer component 142 can compare the confidence metric indicating that the likelihood that the output is an anticipatory statement to a threshold metric. Responsive to a determination that the confidence metric is greater than the threshold metric, the sequence analyzer component 142 can determine that the output is a anticipatory statement. On the other hand, responsive to a determination that the confidence metric is less than or equal to the threshold metric, the sequence analyzer component 142 can determine that the output is an anticipatory statement. The sequence analyzer component 142 can compare the confidence metric indicating that the likelihood that the input is an expectative statement to a threshold metric. Responsive to a determination that the confidence metric is greater than the threshold metric, the sequence analyzer component 142 can determine that the input is an expectative statement. On the other hand, responsive to a determination that the confidence metric is less than or equal to the threshold metric, the sequence analyzer component 142 can determine that the input is an expectative statement.

The sequence analyzer component 142 can also classify or determine the input or the output based on comparing at least a subset of strings in the input and at least a subset of strings in the output to lists of keywords. The lists of keywords can be stored and maintained on the data repository 150. At least one list of keywords can include a set of keywords or phrases in the output that correlate to terminal statements (e.g., "Done", "Finished", and "Found"). At least one list of keywords can include a set of keywords or phrases in the output that correlate to anticipatory statements (e.g., "Would", "How", and "Please"). At least one list of keywords can include a set of keywords or phrases in the input that correlate to expectative statements (e.g., "More", "Multiple", and "Can"). Each list of keywords can be defined using a regular expression. The regular expression can specify a pattern or a template including a sequence of keywords and syntactic rules for terminal statements, anticipatory statements, and expectative statements. The syntactic rules can indicate which one or more indices within the set of strings in the input or the output to analyze to classify the set of strings as a terminal, anticipatory, or expectative statement. For example, the regular expression for classifying strings as terminal statements can indicate that the ending subset of strings are to be analyzed. The regular expression for classifying strings as anticipatory statements can indicate that the beginning subset of strings are to be analyzed. The lists of keywords and the regular expressions defined for the lists can differ based on the device modality. For example, there may be a list of keywords and regular expression for tablets differing from a list of keywords and regular expressions for smart speakers.

To classify the input and the output, the sequence analyzer component 142 can identify a subset of strings of the input from an starting index, in a middle index, and in an ending index. The sequence analyzer component 142 can also identify a subset of strings of the output from an starting index, in a middle index, and in an ending index. The starting index can include one or more of strings from a beginning of the set of strings (e.g., the first three strings). The middle index can include one or more strings in a middle of the string (e.g., two to four strings in the median of the string). The ending index can include one or more strings toward an end of the string (e.g., the last three strings). The sequence analyzer component 142 can also identify device modality of the client device 104 as specified in the input log or the output log of the I/O record 152. The sequence analyzer component 142 can compare the subset of strings of the input to the list of keywords for expectative statements to determine a number of matches with the list of keywords for expectative statements. The sequence analyzer component 142 can compare the subset of strings of the output to the list of keywords for terminal statements to determine a number of matches with the list of keywords for terminal statements. The sequence analyzer component 142 can compare the subset of strings of the output to the list of keywords for expectative statements to determine a number of matches with the list of keywords for terminal statements. The sequence analyzer component 142 can compare the subset of strings to the list of keywords for the device modality of the client device 104.

Based on the comparisons, the sequence analyzer component 142 can classify or determine the input or output as terminal, anticipatory, or expectative. For the input, the sequence analyzer component 142 can determine that the input is expectative responsive to a determination that the number of matches with the list of keywords for expectative statements is greater than a threshold (e.g., one or more matches). For the output, the sequence analyzer component 142 can compare the number of matches with the list of keywords for terminal statements with the number of matches with the list of keywords for anticipative statements. The sequence analyzer component 142 can determine that the output is terminal, responsive to determining that the number of matches with the list of keywords for terminal statements is greater than the number of matches with the list of keywords for anticipative statements. Conversely, the sequence analyzer component 142 can determine that the output is anticipatory, responsive to determining that the number of matches with the list of keywords for terminal statements is less than the number of matches with the list of keywords for anticipative statements.

In traversing through the I/O record 152, the sequence analyzer component 142 can also identify a consecutive succession of inputs from the I/O record 152 without any intermediary output between the inputs. As discussed above, the agent application 112 can have access to the audio data from the microphone 156 through interfacing with the digital assistant application 108 while the microphone status is set to enabled. As a consequence, some inputs in the input log of the I/O record 152 may not be temporally followed by an output log in the output log of the I/O record 152. From the input log and the output log of the I/O record 152, the sequence analyzer component 142 can find or identify a timestamp of one input. Using the timestamp of the input, the sequence analyzer component 142 can find a timestamp of a subsequent output and a timestamp of a subsequent input. The sequence analyzer component 142 can compare the timestamp of the subsequent output to the timestamp of the subsequent input. Responsive to determining that the timestamp of subsequent output precedes the timestamp of the subsequent input, the sequence analyzer component 142 can identify the input and the subsequent output as a pair as discussed above. In contrast, responsive to determining that the timestamp of the subsequent output succeeds the timestamp of the subsequent input, the sequence analyzer component 142 can identify the input and the subsequent input as a consecutive succession of inputs. By traversing through the I/O record 152, the sequence analyzer component 142 can determine a number of occurrences of consecutive inputs sent from the digital assistant application 108 to the agent application 112.

Furthermore, the sequence analyzer component 142 can also identify null markers in the inputs of the input log on the I/O record 152. The null marker can indicate that no recognizable strings were parsed by the NLP component 118 from the input audio signal acquired by the microphone 156 due to silence or noise (e.g., signal with SNR below the threshold). While traversing through the input log of the I/O record 152, the sequence analyzer component 142 can identify null markers corresponding to the input. The sequence analyzer component 142 can identify the set of strings in the input as null. The sequence analyzer component 142 can count or determine a number of null markers or null sets of strings in the inputs of the input log on the I/O record 152.

The agent evaluator 110 on the data processing system 102 can execute the microphone use detector component 144. The microphone use detector component 144 can identify the microphone status of the microphone 156 relative the output sent from the agent application 112 to the digital assistant application 108. The microphone status can be one of an enabled state or a disable state. For each output on the output log, the microphone use detector component 144 can identify the timestamp of the output. The microphone use detector component 144 can traverse the microphone state log to compare the timestamp of each output to the timestamp of each entry on the microphone state log. In traversing the microphone state log, the microphone use detector component 144 can identify the microphone status of the microphone 156 with the timestamp concurrent with or subsequent to the timestamp of the identified output for each output. The microphone use detector component 144 can identify the microphone status of the microphone 156 as enabled from the microphone state log to permit the agent application 112 to access the audio data acquired from the microphone 156. Conversely, the microphone use detector component 144 can identify the microphone status of the microphone 156 as disabled from the microphone state log to restrict the agent application 112 to access the audio data acquired from the microphone 156.

The microphone use detector component 144 can identify the microphone status of the microphone 156 relative to the input from the digital assistant application 108 to the agent application 112. For each input on the input log, the microphone use detector component 144 can identify the timestamp of the input. The microphone use detector component 144 can traverse the microphone state log to compare the timestamp of each input to the timestamp of each entry on the microphone state log. In traversing the microphone state log, the microphone use detector component 144 can identify the microphone status of the microphone 156 with the timestamp concurrent with or prior to the timestamp of the identified input for each input. The microphone use detector component 144 can identify the microphone status of the microphone 156 as enabled from the microphone state log to permit the agent application 112 to access the audio data acquired from the microphone 156. Conversely, the microphone use detector component 144 can identify the microphone status of the microphone 156 as disabled from the microphone state log to restrict the agent application 112 to access the audio data acquired from the microphone 156.

Using the microphone status of the microphone 156 relative to the input, the microphone use detector component 144 can determine the microphone status of the microphone 156 relative to the output. The change to the microphone status as recorded in the microphone state log can occur prior to the receipt of the output and can be maintained thereafter. The microphone use detector component 144 can traverse the output log to compare the timestamp of the entry on the microphone state log to the timestamps of the outputs. From traversing the input log, the microphone use detector component 144 can identify the timestamp of the output subsequent to the timestamp of the entry on the microphone state log. The microphone use detector component 144 can also traverse the microphone state log to identify the subsequent entry with a timestamp later than the timestamp of the previous entry. The microphone use detector component 144 can compare the timestamp of the subsequent entry on the microphone state log with the timestamp of the subsequent output on the output log. The microphone use detector component 144 can determine that the timestamp of the subsequent entry on the microphone state log is subsequent to the timestamp of the subsequent output on the output log. This can indicate that that microphone status from the previous entry is still effective for the subsequent output. Responsive to the determination, the microphone use detector component 144 can identify the microphone status of the microphone 156 relative to the output as the microphone status identified concurrent with or prior to the input.

With the identification of the microphone status relative to the output, the microphone use detector component 144 can also identify a time duration of the microphone status. The microphone status can be identified as in the enabled state to permit the agent service 106 or the agent application 112 to access the audio data acquired via the microphone 156. The microphone use detector component 144 can identify the specified time duration of the activate or deactivate command sent by the agent application 112 in conjunction with the output. The microphone use detector component 144 can also identify the time duration of the microphone status by traversing the microphone state log. The microphone use detector component 144 can traverse the microphone state log to identify the entry subsequent to the entry for the microphone status relative to the output. The entry identified can be in the disabled state. The microphone use detector component 144 can calculate or determine a difference in the timestamps between the entry for the microphone status relative to the output and the subsequent entry. The microphone use detector component 144 can identify the difference as the time duration.

The agent evaluator 110 on the data processing system 102 can execute the extrusion detector component 146. The extrusion detector component 146 can determine whether the agent application 112 (or the agent service 106) interfacing with the digital assistant application 108 is authorized or unauthorized to access the audio data acquired via the microphone 156. The determination by the extrusion detector component 146 can be based on the classifications and determination of the inputs and outputs by the sequence analyzer component 142. The determination by the extrusion detector component 146 can be further based on the identifications of the microphone statuses relative to the inputs and outputs by the microphone use detector component 144. The classifications of the inputs and outputs in conjunction with the microphone statuses relative to the input or output can be indicative of whether the agent application 112 should have access to the audio data acquired via the microphone 156:

The extrusion detector component 146 can determine that the agent application 112 is unauthorized to access the audio data based on the determination of the output as terminal and the identification of the microphone status relative to the output as enabled. Responsive to the determination, the extrusion detector component 146 can also determine that a potential or attempted exfiltration of the audio data acquired via the microphone 156 by the agent application 112. The extrusion detector component 146 can also determine that the agent application 112 is unauthorized to access the audio data using the input. The extrusion detector component 146 can determine that the agent application 112 is unauthorized to access the audio data based on the classification of the input as expectative. The extrusion detector component 146 can determine that the agent application 112 is unauthorized to access the audio data based on the identification of one or more inputs with null markers or null sets of strings subsequent to the output classified as terminal. The extrusion detector component 146 can determine that the agent application 112 is unauthorized to access the audio data based on the number of occurrences of consecutive inputs on the input log without intermediary outputs. The extrusion detector component 146 can compare the number of occurrences of consecutive inputs to a threshold number. Responsive to determining that the number of occurrences is greater than threshold number, the extrusion detector component 146 can determine that the agent application 112 is unauthorized to access the audio data. The extrusion detector component 146 can determine that the agent application 112 is unauthorized to access based on the time duration of the microphone status as set to enabled subsequent to the receipt of the output. The extrusion detector component 146 can compare the time duration of the microphone status set to enabled to a threshold time. Responsive to determination that the time duration is greater than or equal to the threshold time, the extrusion detector component 146 can determine that the agent application 112 is unauthorized to access the audio data acquired from the microphone 156.

Conversely, the extrusion detector component 146 can determine that the agent application 112 is authorized to access the audio data based on the determination of the output as anticipatory and the identification of the microphone status relative to the output as enabled. Responsive to the determination, the extrusion detector component 146 can also determine a lack of an attempted or potential exfiltration of the audio data acquired via the microphone 156 by the agent application 112. The extrusion detector component 146 can also determine that the agent application 112 is authorized to access the audio data using the input. The extrusion detector component 146 can determine that the agent application 112 is authorized to access the audio data based on the classification of the input as expectative. The extrusion detector component 146 can determine that the agent application 112 is authorized to access the audio data based on the identification of one or more inputs with null markers or null sets of strings subsequent to the output classified as terminal. The extrusion detector component 146 can determine that the agent application 112 is authorized to access the audio data based on the number of occurrences of consecutive inputs on the input log without intermediary outputs. Responsive to determining that the number of occurrences is less than threshold number, the extrusion detector component 146 can determine that the agent application 112 is authorized to access the audio data. The determination that the agent application 112 is authorized to access can be despite the classification of at least one output as terminal. The extrusion detector component 146 can determine that the agent application 112 is authorized to access audio data based on the identification of the microphone status as disabled subsequent to the input. The determination that the agent application 112 is authorized to access can be independent of the classification of the output. The extrusion detector component 146 can determine that the agent application 112 is authorized to access based on the time duration of the microphone status as set to enabled subsequent to the receipt of the output. Responsive to determination that the time duration is less than or equal to the threshold time, the extrusion detector component 146 can determine that the agent application 112 is authorized to access the audio data acquired from the microphone 156. The determination that the agent application 112 is authorized to access can be despite the classification of at least one output as terminal.

The agent evaluator 110 on the data processing system 102 can execute the agent manager component 148. The agent manager component 148 can perform at least one action on the digital assistant application 108 and the agent application 112 (or the agent service 106) based on the determination by the extrusion detector component 146. Responsive to the determination that the agent application 112 is unauthorized to access the audio data acquired via the microphone 156, the agent manager component 148 can perform one or more countermeasures. The countermeasure can include an action on either the digital assistant application 108 or the agent application 112, or both, among other devices of the network 116. The agent manager component 148 can send a configuration command to the digital assistant application 108 on the client device 104 via the network 116 to carry out the countermeasure. The agent manager component 148 can send a configuration command to the agent application 112 on the client device 104 via the network 116 to carry out the countermeasure.

The agent manager component 148 can cause the digital assistant application 108 to present an alert indicating that the agent application 112 is unauthorized to access the audio data. To cause the digital assistant application 108 to present the alert, the agent manager component 148 can send the configuration command. The configuration command can include an action data structure specifying a response or a response phrase to be presented by the digital assistant application 108 through the speaker 154. The configuration command can include an action data structure specifying a response or a response phrase to be displayed on a display of the client device 104. Upon receipt of the configuration command, the response selector component 124 can query the data repository 128 to select or otherwise identify response phrases e.g., from the response data 136, for an output audio signal. Based on identifying the configuration command as specifying output audio, the audio signal generator component 120 can generate and present the output audio signal through the speaker 154 of the client device 104. For example, the response can include an output audio signal generated by the audio signal generator component 120 stating, "Warning, ridesharing application is attempting access to audio data from microphone." The digital assistant application 108 can also display the response phrase through the display.

The agent manager component 148 can also terminate the interfacing between the digital assistant application 108 and the agent application 112, responsive to determining that the agent application 112 is unauthorized to access the audio data acquired by the microphone 156. The agent manager component 148 can send the configuration command specifying that cessation of the interfacing to the interface 114 or to the digital assistant application 108. With receipt of the configuration command, the interface 114 or the digital assistant application 108 can prevent execution of any invocations by the digital assistant application 108 of functions of the agent application 112. The interface 114 or the digital assistant application 108 can also restrict execution of any invocations by the agent application 112 of the functions of the digital assistant application 108. The agent manager component 148 can also send a deactivate command to the digital assistant application 108 to restrict the agent application 112 from accessing to the audio data acquired by the agent application 112. Upon receipt of the deactivate command, the interface 114 can restrict the agent application 112 or the agent service 106 from accessing the audio data.

In addition, the agent manager component 148 can cause the digital assistant application 108 to restrict communications of the audio data from the digital assistant application 108 to the agent application 112. The agent manager component 148 can send a configuration command specifying that the microphone status of the microphone 156 is to be set to disabled after elapsing of a specified time limit (e.g., 15 seconds to 3 minutes). Upon receipt of the configuration command, the interface 114 or the digital assistant application 108 can maintain a timer to count a time elapsed since the receipt of the configuration command. The interface 114 or the digital assistant application 108 can compare the elapsed time to the time limit specified by the configuration command. The interface 114 or the digital assistant application 108 can set the microphone status of the microphone 156 to disabled, responsive to determining that the elapsed time is greater than or equal to the specified time limit.

Furthermore, the agent manager component 148 can also send a notification to the agent service 106 or another entity associated with the agent application 112 (e.g., an application developer for the agent application 112) via the network 116. The notification can indicate that a potential or an attempted exfiltration of audio data acquired by the microphone 156 on the client device 104 by the agent application 112. The notification can be an electronic mail, a push notification, a short message service, and an automated telephone call, among others. The agent manager component 148 can send the notification as part of a configuration command. The agent manager component 148 can also remove the agent application 112 from a software distribution platform (e.g., a digital content delivery system), responsive to a determination that the agent application 112 is unauthorized to access audio data acquired via the microphone 156. The agent manager component 148 can send a notification to the agent service 106 or the associated entity indicating removal of the agent application 112 from the software distribution platform via the network 116.

Conversely, responsive to the determination that the agent application 112 is authorized to access the audio data, the agent manager component 148 can continue permitting the agent application 112 to interface with the digital assistant application 108. The agent manager component 148 can also continue to permit the agent application 112 to access the audio data acquired via the microphone 156. In this manner, the agent evaluator 110 can find any instances of the agent application 112 attempting to exfiltrate audio data acquired from the microphone 156, when the end user of the client device 104 is expecting that interaction with the agent application 112 has ceased. The agent evaluator 110 can also reduce consumption of computing resources and network bandwidth from the unauthorized exfiltration of audio data from the microphone 156 by the agent application 112 interfacing with the digital assistant application 108. Furthermore, with the cessation of surreptitious acquisition of audio data, the digital assistant application 108 can be less vulnerable to lapses in security and data privacy.

Figure 2:
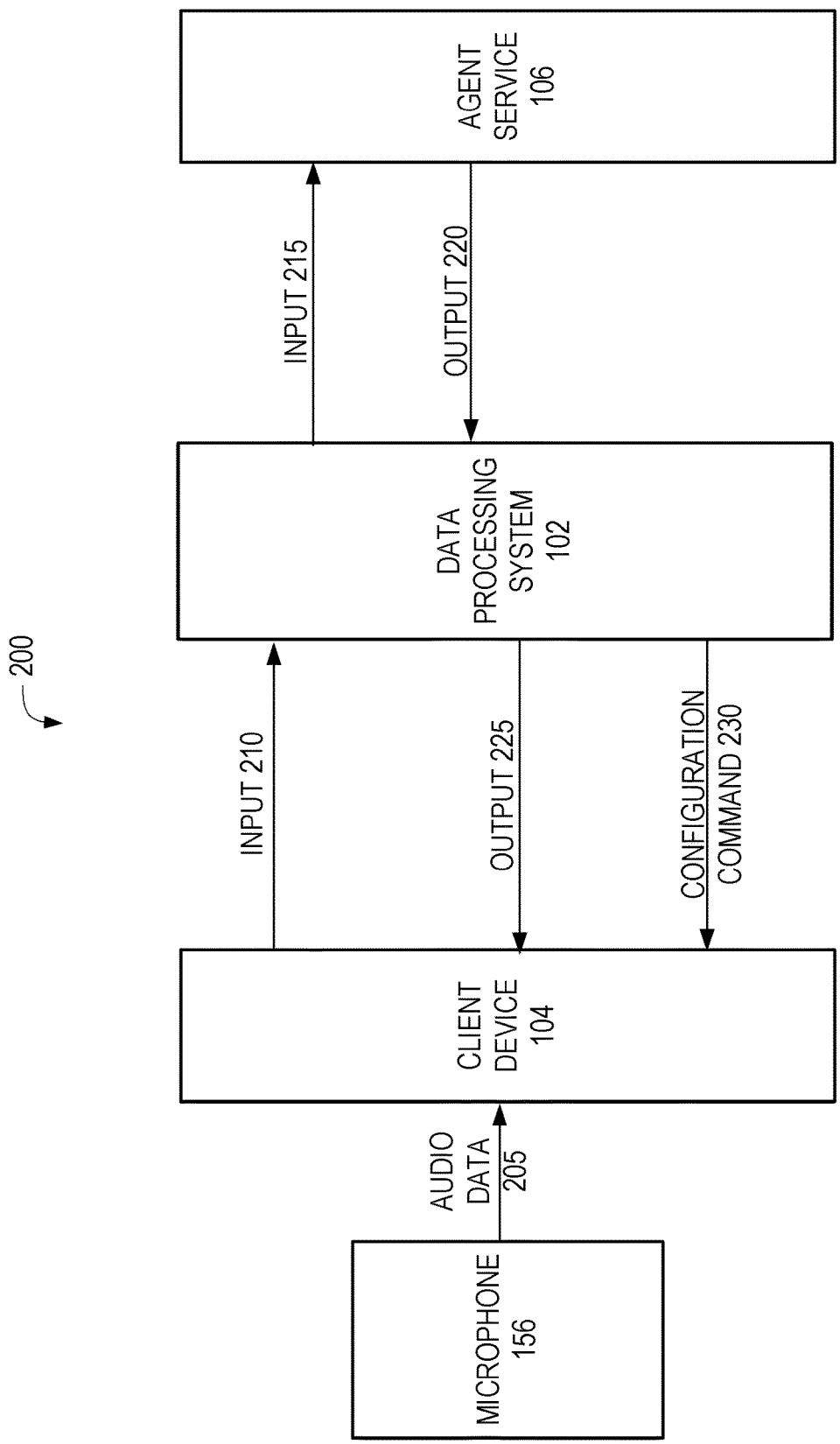
FIG. 2 illustrates a sequence diagram of an example data flow to detect potential exfiltration of audio data by agent applications that interface with digital assistant applications in the system illustrated in FIG. 1, in accordance with an example of the present disclosure.

Referring now to FIG. 2, depicted is a sequence diagram of an example data flow 200 to detect potential exfiltration of audio data by the agent application 112 that interface with the digital assistant application 108 in the system illustrated in FIG. 1. The data flow 200 can be implemented or performed by the system 100 described above in conjunction with FIG. 1 or system 600 detailed below in conjunction with FIG. 6. The data flow 200 an include communications in the form of packets (e.g., HTTP messages) among the microphone 156, the client device 104, the data processing system 102, and the agent service 106 via the network 116.

A local instance of the digital assistant application 108 running on the client device 104 can detect audio data 205 via the microphone 156. The digital assistant application 108 running on the client device 104 can perform initial processing on the input audio signal to generate a input 210. The input 210 (sometimes referred herein as a request) can include the input audio signal itself or one or more strings identified in the audio data 205 using machine learning techniques. The client device 104 can transmit the input 210 to the data processing system 102. A remote instance of the digital assistant application 108 running on the data processing system 102 can perform additional processing on the input 210. The NLP component 118 running on the data processing system 102 can parse the input 210 to determine that the input 210 is referencing a function to be performed by the agent application 112 running on the agent service 106. The NLP component 118 can also identify the request corresponding to the function and referential keywords from the audio data 205 using semantic analysis techniques. In response to the determination, the direct action handler component 122 can package the information into an action data structure to generate an input 215. The interface 114 can also set the microphone status of the microphone 156 to enabled to permit the agent service 106 for the agent application 112 to access audio data 205. The direct action handler component 122 can send the input 215 to the agent service 106.

Upon receipt of the input 215, an instance of the agent application 112 running on the agent service 106 can parse the input 215 to perform the action indicated in the input 215. In performing the action, the agent application 112 can generate an output 220. The output 220 can include a response or information used to select and generate a response phrase. The agent service 106 can send the output 220 to the data processing system 102. The digital assistant application 108 running on the data processing system 102 can perform processing to the output 220. For example, the response selector component 124 running on the data processing system 102 can select response data using the output 220. Using the response data, the response selector component 124 running on the data processing system 102 can generate and transmit an output 225 to the client device 104. The audio signal generator component 120 running on the client device 104 can use the response data in the output 220 to generate and present an output audio signal indicating the result of the performance of the function of the agent application 112 at the agent service 106.

In conjunction, an instance of the agent evaluator 110 running on the data processing system 102 can perform analysis on the input 210 from the digital assistant application 108 running on the client device 104 and the output 220 from the agent application 112 running on the agent service 106. For example, the sequence analyzer component 142 can classify the strings in the input 210 as an expectative statement using the I/O exchange model. The sequence analyzer component 142 can further classify the strings in the output 220 as a terminal statement or an anticipatory statement. The microphone use detector component 144 can also identify the microphone status of the microphone 156 at the time of the receipt of the output 220. Based on the classifications of the strings in the input 210 and the output 220 and the identification of the microphone status, the extrusion detector component 146 can determine whether the agent application 112 is authorized to access the audio data from the microphone 156. For example, when the output 220 is classified as terminal and the microphone status is identified as enabled, the extrusion detector component 146 can determine that the agent application 112 is unauthorized to access the audio data from the microphone 156. The agent manager component 148 in turn can send a configuration command 230 to the digital assistant application 108 running on the client device 104 based on the determination. For instance, the agent manager component 148 can send a configuration command 230 to the client device 104 specifying that the instance of the agent application 112 running on the client device 104 is restricted from accessing the audio data from the microphone 156, when determined to be unauthorized.

Figure 3:
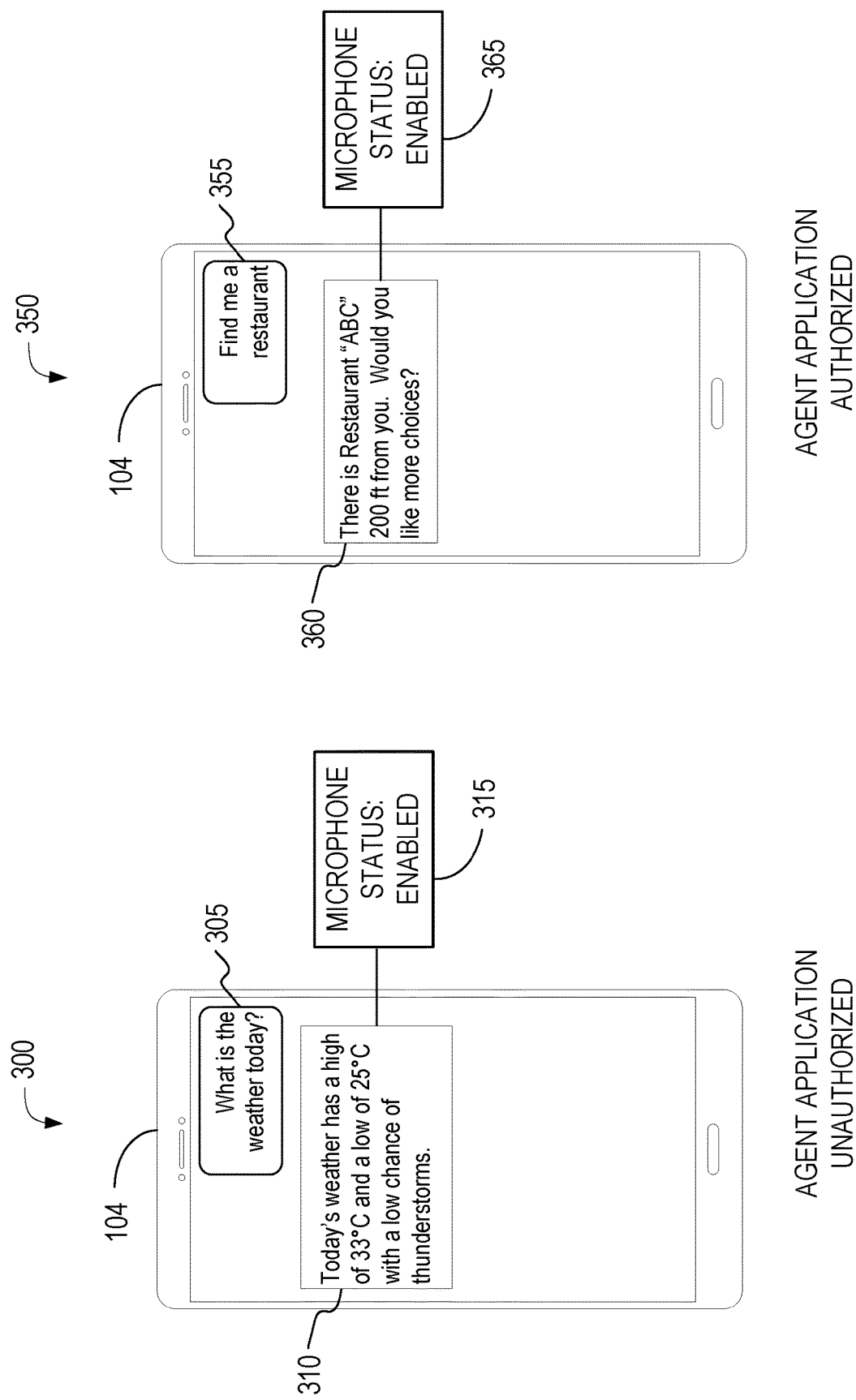
FIG. 3 illustrates a client computing device with input messages and output messages, in accordance with an example of the present disclosure.

Referring now to FIG. 3, depicted is the client device 104 with request messages and response messages under two configurations 300 and 350. In configuration 300, the digital assistant application 108 running on the client device 104 can receive an input audio signal via the microphone 156. The NLP component 118 can use natural language processing techniques to identify one or more words in the input audio signal. The digital assistant application 108 can display the output as a text content item 305 including the words "What is the weather today?" as parsed from the input audio signal. The NLP component 118 can also determine that the input audio signal is referring to an agent application 112 for a weather service based on the one or more word identified therein. The direct action handler component 122 can package the one or more words into an action data structure as an input to the agent application 112 for the weather service. The agent application 112 can perform the function indicated by the action data structure, and can generate a response to the input. The response selector component 124 can in turn receive the response outputted from the agent application 112, and generate a response phrase. The digital assistant application 108 can display the response phrase as a text content item 310 including the words "Today's weather has a high of 33° C. and a low of 25° C. with a low chance of thunderstorms." In conjunction, the sequence analyzer component 142 can use the words in the input and the output to classify the output as a terminal response to the input query. The microphone use detector component 144 can identify the microphone status 315 at the time of the response query as enabled. Based on the classification of the output as terminal and the microphone status 315 as enabled, the extrusion detector component 146 can determine that the agent application 112 is unauthorized to access the audio data acquired from the microphone 156. The agent manager component 148 can also perform one or more countermeasures in response to the determination.

In configuration 350, the digital assistant application 108 running on the client device 104 can receive an input audio signal via the microphone 156. The NLP component 118 can use natural language processing techniques to identify one or more words in the input audio signal. The digital assistant application 108 can display the output as a text content item 355 including the words "Find me a restaurant" as parsed from the input audio signal. The NLP component 118 can also determine that the input audio signal is referring to an agent application 112 for a navigation service based on the one or more word identified therein. The direct action handler component 122 can package the one or more words into an action data structure as an input to the agent application 112 for the weather service. The agent application 112 can perform the function indicated by the action data structure, and can generate a response to the input. The response selector component 124 can in turn receive the response outputted from the agent application 112, and generate a response phrase. The digital assistant application 108 can display the response phrase as a text content item 360 including the words "There is Restaurant 'ABC' 200 ft. from you. Would you like more choices?" In conjunction, the sequence analyzer component 142 can use the words in the input and the output to classify the output as an anticipatory response to the input query. The microphone use detector component 144 can identify the microphone status 365 at the time of the response query as enabled. Based on the classification of the output as anticipatory and the microphone status 365 as enabled, the extrusion detector component 146 can determine that the agent application 112 is authorized to access the audio data acquired from the microphone 156.

Figure 4:
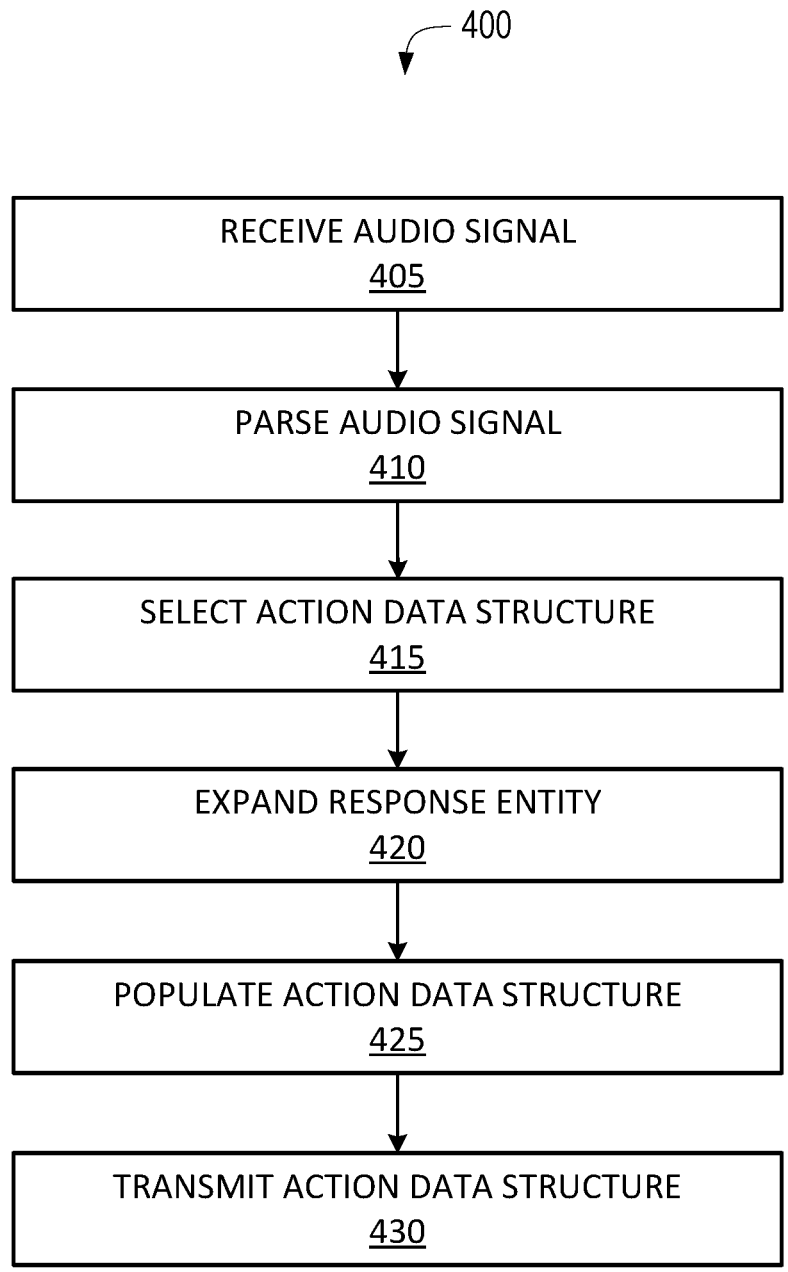
FIG. 4 illustrates a flow diagram of a method to generate voice-activated threads in a networked computer environment, in accordance with an example of the present disclosure.

FIG. 4 illustrates a block diagram of an example method 400 to generate voice-activated threads in a networked computer environment. The method 400 can be implemented or executed by the system 100 described above in conjunction with FIGS. 1-3 or system 600 detailed below in conjunction with FIG. 6. The method can include receiving an input audio signal (405). The method 400 can include parsing the input audio signal (410). The method 400 can include selecting an action data structure (415). The method 400 can include expanding a response entity (420). The method can include populating the action data structure (425). The method 400 can include transmitting the digital component (430).

The method 400 can include can include receiving an input signal (405). The method can include receiving, by an NLP component 118 executed by a data processing system 102 108, the input signal. The input signal can be an input audio signal that is detected by a sensor at a first client device and transmitted to the data processing system 102. The sensor can be a microphone of the first client device. For example, a digital assistant component executed at least partially by a data processing system 102 that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system 102 can receive the audio input for a session corresponding to the conversation.

The method 400 can include parsing the input signal (410). The NLP component 118 of the data processing system 102 can parse the input signal to identify a request. The NLP component 118 can identify at least one entity in the input signal. The request can be an intent or request that can be fulfilled by one or more service provider devices. The request can be a part of a conversational phrase. For example, the request can be "Ok, order a car to take me home." The entities identified by the NLP component 118 can be phrases or terms in the request that map to input fields or types the service provider device requests when fulfilling a request. For example, the service provider device providing the car service may request a current location input field and a destination input field. Continuing the above example, the NLP component 118 can map the term "home" to the destination input field.

The method 400 can include selecting an action data structure (415). The data processing system 102 can select the action data structure based on the request parsed from the input signal. The data processing system 102 can select the action data structure based on the service provider device that can fulfill the request. The action data structure can be a data structure or object that is created by the service provider device. The service provider device can provide the action data structure to the data processing system 102. The action data structure can indicate fields, data, or information that the service provider device uses to fulfill requests. The service provider device can flag one or more of the fields to request that the data processing system 102 expand the entity returned for that field. When a field is flagged for expansion, the data processing system 102 can design and generate conversation-based data exchanges with the client device 104 to retrieve information or data for the flagged field rather than the service provider device 160 designing the conversation-based data exchange.

The method 400 can include expanding the response entity (420). The data processing system 102 can determine the entity mapped to the input field needs to be expanded if the entity is not in a format specified by the service provider device. Continuing the above example, the NLP component 118 can determine "home" is the entity mapped to a destination. The direct action handler component 122 can determine to update the action data structure to include the entity "home" in a destination field. The direct action handler component 122 can determine the format of the response entity does not match the format of the destination field. For example, the destination field can have the format of an object that requests a street address, city, state, and zip code. Detecting a mismatch between the format of the response entity and the format of the field, the data processing system 102 can expand the entity to a street address, city, state, and zip code format. For example, the data processing system 102 can look up the address the end user provided the data processing system 102 as the end user's "home" address. The data processing system 102 can expand the entity based on an expansion policy. The expansion policy can indicate whether the data processing system 102 has permission to expand the term or can indicate what end user or client computing device provided data can be included in an expanded entity.

The data processing system 102 can expand the entity based on a request from a service provider device. For example, the data processing system 102 can generate a first action data structure with the unexpanded entity. The data processing system 102 can transmit the first action data structure to the service provider device for processing to fulfill the request. The service provider device can return the action data structure (or a portion thereof) to the data processing system 102 if the service provider device cannot process or understand the data in on or more of the action data structure's fields. For example, the service provider device can attempt to process the "home" entity in the destination field and then request the data processing system 102 expand the "home" entity after the service provider device determines that it cannot process or understand the entity.

The method 400 can include populating the action data structure (425). The direct action handler component 122 can populate the action data structure with the expanded entity. The direct action handler component 122 can populate the action data structure with the entity. For example, the action data structure can be an object into which the entity or expanded entity is stored. Populating the action data structure can also be referred to update the action data structure.

The method 400 can include transmitting the action data structure (430). The data processing system 102 can transmit the populated action data structure to the service provider device. Upon receipt of the action data structure, the service provider device can fulfill the request or request additional information from the data processing system 102 or client computing device.

Figure 5:
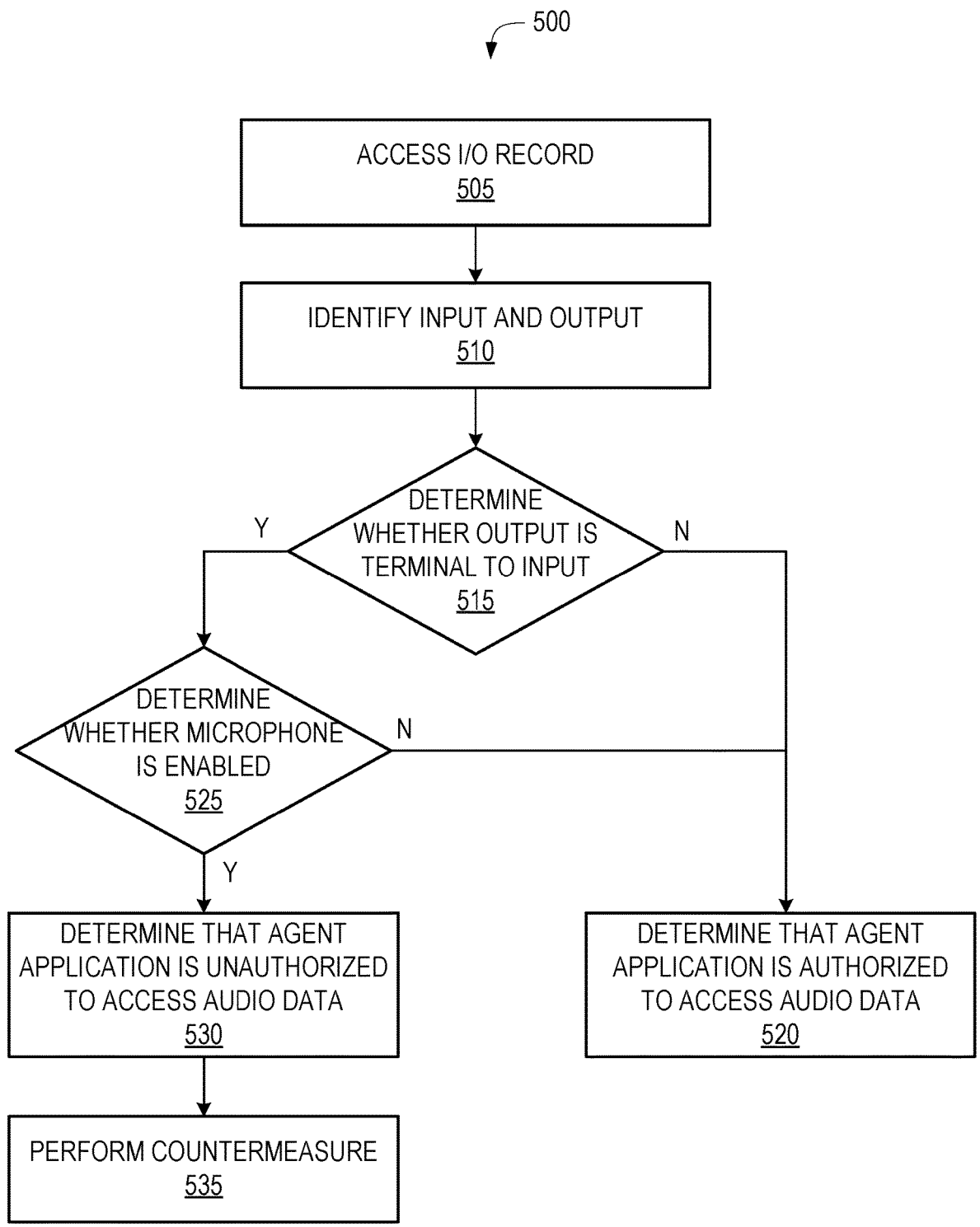
FIG. 5 illustrates a flow diagram of a method to detect potential exfiltration of audio data by agent applications that interface with digital assistant applications using the example system illustrated in FIG. 1, in accordance with an example of the present disclosure.

Referring now to FIG. 5, depicted is an example method 500 to detect potential exfiltration of audio data by agent applications that interface with digital assistant applications. The method 500 can be implemented or executed by the system 100 described above in conjunction with FIGS. 1-3 or system 600 detailed below in conjunction with FIG. 5. The method 500 can include accessing I/O record 152 (ACT 505). For example, the exchange logger component 140 can maintain and access the I/O record 152 on the data repository 150. The I/O record 152 can include an input log, an output log, and a microphone state log. The input log can include a set of strings parsed by the NLP component 118 from the input audio signal acquired by the microphone 156 and a receipt timestamp for each set of strings. The output log can include a set of strings in the response from the agent application 112 in performing a function indicated in at least one of the inputs and a receipt timestamp for each set of strings. The microphone state log can include timestamps and microphone status of the microphone 156 at each timestamp. The microphone status can be one of enabled or disabled.

The method 500 can include identifying an input and an output (ACT 510). For example, the sequence analyzer component 142 can traverse through the I/O record 152 to identify a pair of an input and an output. While traversing, the sequence analyzer component 142 can identify each input from the input log of the I/O record 152. For each input, the sequence analyzer component 142 can identify the timestamp of the receipt of the input from the digital assistant application 108 to the agent application 112. In conjunction, the sequence analyzer component 142 can identify each output from the output log of the I/O record 152 and the timestamp for the output. The sequence analyzer component 142 can find or identify the timestamp of the output subsequent to the timestamp of the input. The input and the subsequent output can be identified by the sequence analyzer component 142 as a pair.

The method 500 can include determining whether the output is terminal to the input (ACT 515). For example, the sequence analyzer component 142 can classify the output as terminal or anticipatory based on the set of strings of the input and on the set of strings of the output. A terminal statement can correspond to an end of a conversation between the digital assistant application 108 and the agent application 112. An anticipatory statement can correspond to an indication to the recipient end user that the agent application 112 is expecting additional, follow-up queries. The sequence analyzer component 142 can use an I/O exchange model or a list of keywords defined for each type of statement.

The method 500 can include determining that the agent application 112 is authorized to access the audio data (ACT 520). For example, the sequence analyzer component 142 can classify the set of strings in the output as anticipatory, indicating to the end user to provide additional input queries. Responsive to this determination, the extrusion detector component 146 can determine that the agent application 112 is authorized to access the audio data from the microphone 156. The agent manager component 148 can also permit the agent application 112 to continue accessing the audio data form the microphone 156.

The method 500 can include determining whether the microphone is enabled (ACT 525). For example, the microphone use detector component 144 can access the microphone log of the I/O record 152. The microphone use detector component 144 can identify the entry of the microphone status of the microphone 156 on the microphone log subsequent to the timestamp of the prior input. The microphone status can be enabled to permit the agent application 112 to access the audio data from the microphone 156. Conversely, the microphone status can be disabled to restrict the agent application 112 from accessing the audio data from the microphone 156. The microphone use detector component 144 can determine whether the microphone status of the microphone 156 is set to enabled or disabled from the entry on the microphone log. Responsive to determining that the microphone status is set to disabled, the functionality of ACT 520 can be performed.

The method 500 can include determining that the agent application is unauthorized to access the audio data (ACT 530). For example, responsive to determining that the output is terminal and the microphone status is set to enabled, the extrusion detector component 146 can determine that the agent application 112 is unauthorized to access the audio data from the microphone 156. The extrusion detector component 146 can also determine that an attempted or potential exfiltration of the audio data by the agent application 112 via the microphone 156.

The method 500 can include performing countermeasure (ACT 535). For example, with the determination the agent application 112 is unauthorized to access the audio data, the agent manager component 148 can perform the countermeasure to restrict the agent application 112 from accessing the audio data. The agent manager component 148 can cause the digital assistant application 108 to present an alert indicating that the agent application 112 is unauthorized to access the audio data. The agent manager component 148 can also terminate the interfacing between the digital assistant application 108 and the agent application 112. In addition, the agent manager component 148 can also send a notification to the agent service 106 or another entity associated with the agent application 112 (e.g., an application developer for the agent application 112).

Figure 6:
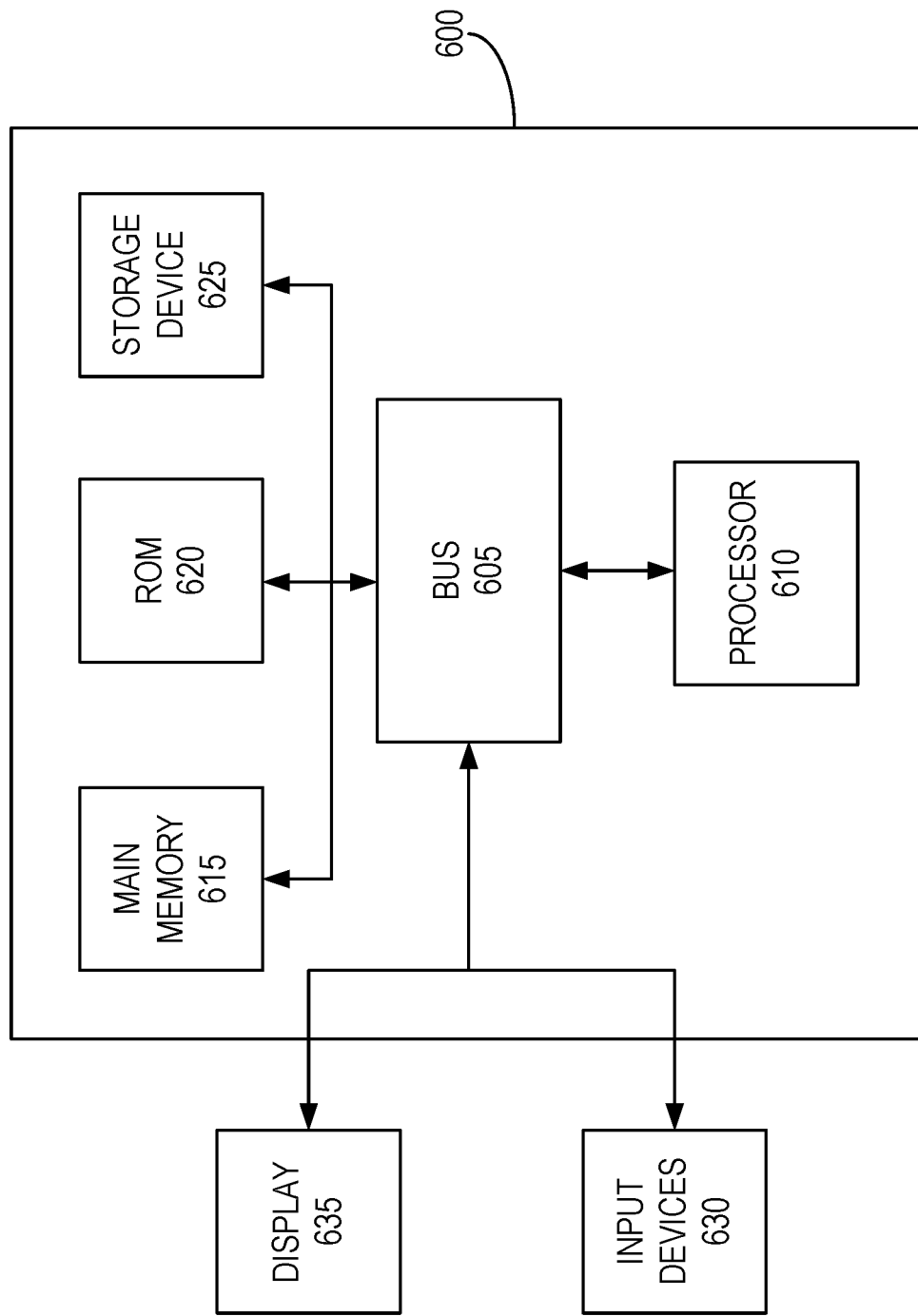
FIG. 6 is a block diagram of an example computer system.

FIG. 6 is a block diagram of an example computer system 600. The computer system or computing device 600 can include or be used to implement the system 100 or its components such as the data processing system 102. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information and instructions to be executed by the processor 610. The main memory 615 can be or include the data repository 128 or 148. The main memory 615 can also be used for storing position information, temporary variables, or other intermediate information during execution of instructions by the processor 610. The computing system 600 may further include a read-only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repositories 128 or 148.

The computing system 600 may be coupled via the bus 605 to a display 635, such as a liquid crystal display or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client devices 104, or other components of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network (e.g., the network 116). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the agent service 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 118 and the direction action handler 122 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors, the method comprising:
    identifying an input received from a digital assistant application via a microphone of a client device and an output received, subsequent to the input, from an agent application that interfaces with the digital assistant application;
    determining, using an input/output exchange model, that the output is terminal to the input;
    determining, subsequent to receiving the output, that the agent application is attempting to continue to access audio data acquired using the microphone; and
    in response to determining that (i) the output is terminal to the input and (ii) subsequent to receiving the output, the agent application is attempting to continue to access the audio data acquired using the microphone, providing a notification to a user, the notification indicating that the agent application is not authorized to continue to access the audio data.

2. The method according to claim 1, wherein the notification comprises an output audio signal.

3. The method according to claim 1, wherein the notification is displayed on a display of the client device.

4. The method according to claim 1, further comprising, in response to determining that (i) the output is terminal to the input and (ii) subsequent to receiving the output, the agent application is attempting to continue to access the audio data acquired using the microphone, preventing executing of functions of the agent application.

5. The method according to claim 1, further comprising, in response to determining that (i) the output is terminal to the input and (ii) subsequent to receiving the output, the agent application is attempting to continue to access the audio data acquired using the microphone, sending a deactivation command to the digital assistant application to restrict the agent application from accessing the audio data acquired using the microphone.

6. The method according to claim 1, further comprising, in response to determining that (i) the output is terminal to the input and (ii) subsequent to receiving the output, the agent application is attempting to continue to access the audio data acquired using the microphone, causing the agent application to be removed from a software distribution platform.

7. The method according to claim 1, further comprising sending a configuration command specifying that a microphone status is to be set to disabled after a predetermined amount of time has elapsed.

8. A computer program product comprising one or more computer-readable storage media having program instructions collectively stored on the one or more computer-readable storage media, the program instructions executable to:
    identify an input received from a digital assistant application via a microphone of a client device and an output received, subsequent to the input, from an agent application that interfaces with the digital assistant application;

determine, using an input/output exchange model, that the output is terminal to the input;

determine, subsequent to receiving the output, that the agent application is attempting to continue to access audio data acquired using the microphone; and in response to determining that (i) the output is terminal to the input and (ii) subsequent to receiving the output, the agent application is attempting to continue to access the audio data acquired using the microphone, provide a notification to a user, the notification indicating that the agent application is not authorized to continue to access the audio data.

9. The computer program product according to claim 8, wherein the notification comprises an output audio signal.

10. The computer program product according to claim 8, wherein the notification is displayed on a display of the client device.

11. The computer program product according to claim 8, wherein the program instructions are further executable to, in response to determining that (i) the output is terminal to the input and (ii) subsequent to receiving the output, the agent application is attempting to continue to access the audio data acquired using the microphone, prevent executing of functions of the agent application.

12. The computer program product according to claim 8, wherein the program instructions are further executable to, in response to determining that (i) the output is terminal to the input and (ii) subsequent to receiving the output, the agent application is attempting to continue to access the audio data acquired using the microphone, send a deactivation command to the digital assistant application to restrict the agent application from accessing the audio data acquired using the microphone.

13. The computer program product according to claim 8, wherein the program instructions are further executable to, in response to determining that (i) the output is terminal to the input and (ii) subsequent to receiving the output, the agent application is attempting to continue to access the audio data acquired using the microphone, cause the agent application to be removed from a software distribution platform.

14. The computer program product according to claim 8, wherein the program instructions are further executable to send a configuration command specifying that a microphone status is to be set to disabled after a predetermined amount of time has elapsed.

15. A system comprising:
a processor, a computer-readable memory, one or more computer-readable storage media, and program instructions collectively stored on the one or more computer-readable storage media, the program instructions executable to:

identify an input received from a digital assistant application via a microphone of a client device and an output received, subsequent to the input, from an agent application that interfaces with the digital assistant application;

determine, using an input/output exchange model, that the output is terminal to the input;

determine, subsequent to receiving the output, that the agent application is attempting to continue to access audio data acquired using the microphone; and in response to determining that (i) the output is terminal to the input and (ii) subsequent to receiving the output, the agent application is attempting to continue to access the audio data acquired using the microphone, provide a notification to a user, the notification indicating that the agent application is not authorized to continue to access the audio data.

16. The system according to claim 15, wherein the notification comprises an output audio signal.

17. The system according to claim 15, wherein the notification is displayed on a display of the client device.

18. The system according to claim 15, wherein the program instructions are further executable to, in response to determining that (i) the output is terminal to the input and (ii) subsequent to receiving the output, the agent application is attempting to continue to access the audio data acquired using the microphone, prevent executing of functions of the agent application.

19. The system according to claim 15, wherein the program instructions are further executable to, in response to determining that (i) the output is terminal to the input and (ii) subsequent to receiving the output, the agent application is attempting to continue to access the audio data acquired using the microphone, send a deactivation command to the digital assistant application to restrict the agent application from accessing the audio data acquired using the microphone.

20. The system according to claim 15, wherein the program instructions are further executable to, in response to determining that (i) the output is terminal to the input and (ii) subsequent to receiving the output, the agent application is attempting to continue to access the audio data acquired using the microphone, cause the agent application to be removed from a software distribution platform.

* * * * *